United States Patent
Tanimoto

(10) Patent No.: US 8,069,246 B2
(45) Date of Patent: Nov. 29, 2011

(54) RELAY SERVER AND RELAY COMMUNICATION SYSTEM INCLUDING A RELAY GROUP INFORMATION REGISTRATION UNIT, A SHARED RESOURCE INFORMATION REGISTRATION UNIT, AND A CONTROL UNIT

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 156 days.

(21) Appl. No.: 12/340,868

(22) Filed: Dec. 22, 2008

(65) Prior Publication Data

US 2009/0172075 A1    Jul. 2, 2009

(30) Foreign Application Priority Data

Dec. 28, 2007   (JP) ................................ 2007-339673

(51) Int. Cl.
*G06F 15/173* (2006.01)
(52) U.S. Cl. ........ 709/226; 709/203; 709/206; 709/217; 709/229; 709/246; 370/352; 370/389
(58) Field of Classification Search .................. 709/203, 709/206, 217, 218, 225, 226, 229, 238, 246; 370/352, 389, 401
See application file for complete search history.

(56) References Cited

U.S. PATENT DOCUMENTS

| | | | |
|---|---|---|---|
| 6,898,641 B1 | 5/2005 | Kobayashi | |
| 6,988,199 B2 | 1/2006 | Toh et al. | |
| 7,139,811 B2 | 11/2006 | Lev Ran et al. | |
| 7,174,378 B2 | 2/2007 | Yoon et al. | |
| 2001/0047414 A1 | 11/2001 | Yoon et al. | |
| 2002/0118398 A1* | 8/2002 | Tanimoto ........................ 358/407 |
| 2002/0143855 A1* | 10/2002 | Traversat et al. ............. 709/202 |
| 2002/0143960 A1 | 10/2002 | Goren et al. | |
| 2002/0146002 A1 | 10/2002 | Sato | |
| 2004/0083385 A1 | 4/2004 | Ahmed et al. | |
| 2004/0148432 A1 | 7/2004 | Udono et al. | |
| 2004/0172395 A1 | 9/2004 | Edelstein et al. | |

(Continued)

FOREIGN PATENT DOCUMENTS

JP         04-105143 A    4/1992

(Continued)

OTHER PUBLICATIONS

Shinji Okumura et al., SIP (session initiation protocol), Nikkei Communications, Sep. 22, 2003, pp. 150-158 (partial translation pp. 155-156 (Usable in IM and Presence Notification)).

(Continued)

*Primary Examiner* — Yves Dalencourt
(74) *Attorney, Agent, or Firm* — Keating & Bennett, LLP

(57) ABSTRACT

A process of automatically transferring a file can be performed via an external network without using a VPN. A plurality of client terminals is separately connected with a relay server and can share a resource. The client terminal monitors the addition of a resource to a specified transfer source folder. When the resource is added, the client terminal adds information regarding the resource to the shared resource information. The updated shared resource information is shared with other client terminals via the relay server. When the client terminal detects the update, the client terminal transmits a resource transfer request to the client terminal via the relay server. When data of the resource is received via the relay server, the client terminal stores the resource in a specified transfer destination folder.

8 Claims, 13 Drawing Sheets

U.S. PATENT DOCUMENTS

| | | |
|---|---|---|
| 2004/0255048 A1 | 12/2004 | Lev Ran et al. |
| 2005/0076098 A1 | 4/2005 | Matsubara et al. |
| 2006/0083171 A1 | 4/2006 | Tanaike et al. |
| 2006/0101064 A1* | 5/2006 | Strong et al. .................. 707/102 |
| 2006/0256771 A1 | 11/2006 | Yarlagadda |
| 2006/0282540 A1 | 12/2006 | Tanimoto |
| 2007/0022477 A1 | 1/2007 | Larson |
| 2007/0233844 A1 | 10/2007 | Tanimoto |
| 2008/0089349 A1 | 4/2008 | Tanimoto |
| 2008/0098088 A1 | 4/2008 | Tamano et al. |
| 2008/0288591 A1 | 11/2008 | Tanimoto |

FOREIGN PATENT DOCUMENTS

| | | | |
|---|---|---|---|
| JP | 09-282216 | A | 10/1997 |
| JP | 2001-092702 | A | 4/2001 |
| JP | 2001-292167 | A | 10/2001 |
| JP | 2001-306382 | A | 11/2001 |
| JP | 2002-007182 | A | 1/2002 |
| JP | 2002-199150 | A | 7/2002 |
| JP | 2002-217943 | A | 8/2002 |
| JP | 2002-288415 | A | 10/2002 |
| JP | 2002-314573 | A | 10/2002 |
| JP | 2003-032310 | A | 1/2003 |
| JP | 2004-201255 | A | 7/2004 |
| JP | 2004-265415 | A | 9/2004 |
| JP | 2004-310371 | A | 11/2004 |
| JP | 2005-027040 | A | 1/2005 |
| JP | 2005-115943 | A | 4/2005 |
| JP | 2005-328239 | A | 11/2005 |
| JP | 2006-033105 | A | 2/2006 |
| JP | 2006-268138 | A | 10/2006 |
| JP | 2006-343943 | A | 12/2006 |
| JP | 2007-265135 | A | 10/2007 |
| JP | 2007-267136 | A | 10/2007 |
| JP | 2008-098699 | A | 4/2008 |
| JP | 2008-098888 | A | 4/2008 |
| JP | 2008-148125 | A | 6/2008 |
| JP | 2008-154101 | A | 7/2008 |
| JP | 2008-306500 | A | 12/2008 |
| JP | 2009-027652 | A | 2/2009 |
| JP | 2009-163300 | A | 7/2009 |
| JP | 2009-163302 | A | 7/2009 |
| JP | 2009-252159 | A | 10/2009 |
| JP | 2009-265919 | A | 11/2009 |

OTHER PUBLICATIONS

Tanimoto; "Relay-Server"; U.S. Appl. No. 11/853,943, filed Sep. 12, 2007.
Tanimoto; "File Server Device"; U.S. Appl. No. 11/862,654, filed Sep. 27, 2007.
Tanimoto; "File Transfer Server"; U.S. Appl. No. 11/870,622, filed Oct. 11, 2007.
Tanimoto; "Relay Server, Relay Communication System, and Communication Device"; U.S. Appl. No. 11/944,495, filed Nov. 23, 2007.
Tanimoto; "Relay Server and Relay Communication System"; U.S. Appl. No. 11/953,505, filed Dec. 10, 2007.
Tanimoto; "Relay Server and Client Terminal"; U.S. Appl. No. 11/953,351, filed Dec. 10, 2007.
Tanimoto; "Relay Server and Relay Communication System"; U.S. Appl. No. 12/103,933, filed Apr. 16, 2008.
Tanimoto; "Relay Server and Relay Communication System"; U.S. Appl. No. 12/112,127, filed Apr. 30, 2008.
Tanimoto; "Relay Server and Relay Communication System"; U.S. Appl. No. 12/107,793, filed Apr. 23, 2008.
Tanimoto; "Relay Server and Relay Communication System"; U.S. Appl. No. 12/270,883, filed Nov. 14, 2008.
Tanimoto; "Relay Server and Relay Communication System"; U.S. Appl. No. 12/335,642, filed Dec. 16, 2008.
Tanimoto; "Relay Server and Relay Communication System"; U.S. Appl. No. 12/335,661, filed Dec. 16, 2008.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.
Tanimoto, "Relay Server", U.S. Appl. No. 10/114,963, filed Apr. 2, 2002.
Tanimoto, "Relay Server, Network Device, Communication System, and Communication Method", U.S. Appl. No. 10/116,615, filed Apr. 2, 2002.
Official Communication issued in U.S. Appl. No. 11/723,466, mailed on Nov. 8, 2010.
Tanimoto; "Relay Device and Communication System"; U.S. Appl. No. 11/723,466, filed on Mar. 20, 2007.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
English translation of Official Communication issued in corresponding Japanese Patent Application No. 2006-334652, mailed on Jun. 8, 2010.
English translation of Official Communication issued in corresponding Japanese Patent Application No. 2007-152122, mailed on Jun. 2, 2010.
Tanimoto, "Relay Server and Relay Communication System", U.S. Appl. No. 13/061,234, filed Feb. 28, 2011.
Tanimoto, "Relay Server, Relay Communication System, and Communication Apparatus", U.S. Appl. No. 13/061,725, filed Mar. 2, 2011.

* cited by examiner

FIG. 6

```xml
<?xml version="1.0" encoding="Shift_JIS" ?>
<root>
    <relay-group group-id="0001@relay-server1" >
        <relay-account account="relay-server1@net" name="branch office A">
            <user-account account="client11@relay-server1.net" name="client11" group="0001" />
            <user-account account="client12@relay-server1.net" name="client12" group="0001" />
        </relay-account>
        <relay-account account="relay-server2@net" name="branch office B">
            <user-account account="client21@relay-server1.net" name="client21" group="0002" />
            <user-account account="client22@relay-server1.net" name="client22" group="0002" />
        </relay-account>
        <relay-account account="relay-server3@net" name="branch office C">
            <user-account account="client31@relay-server1.net" name="client31" group="0003" />
        </relay-account>
    </relay-group>
    <relay-group group-id="0002@relay-server1" >
        <relay-account account="relay-server1@net" name="branch office A">
            <user-account account="client11@relay-server1.net" name="client11" group="0001" />
        </relay-account>
        <relay-account account="relay-server2@net" name="branch office B">
            <user-account account="client21@relay-server1.net" name="client21" group="0002" />
        </relay-account>
    </relay-group>
</root>
```

FIG. 7

```
<?xml version="1.0" encoding="Shift_JIS" ?>                                      120
<user-account account="client11@relay-server1.net">                              121
  <policy name="workspace1" policy-id="200710011500032client11@relay-server1">   122 (122a)
    <family-account-info>                                                        123
      <user-account account="client11@relay-server1.net"/>          } 124
      <user-account account="client21@relay-server2.net"/>            (124a)
    </family-account-info>
    <family-resource-info>
      <resource name="FromFolder" owner="client11@relay-server1.net" value="c:/FromFolder"   126 (126a)
type="folder" status="ok">                                                                  } 125
        <resource name="file001.pdf" owner="client11@relay-server1.net" value="c:/FromFolder/file001.pdf"  126 (126b)
type="file" status="ok"/>
      </resource>
    </family-resource-info>
  </policy>
  <policy name="workspace2" policy-id="200710021033l1client11@relay-server1">    122 (122b)
    <family-account-info>                                                        123
      <user-account account="client11@relay-server1.net"/>          } 124 (124b)
      <user-account account="client31@relay-server3.net"/>
    </family-account-info>
    <family-resource-info>
      <resource name="FromFolder2" owner="client11@relay-server1.net" value="c:/FromFolder2"  126 (126c)
type="folder" status="ok">                                                                   } 125
        <resource name="file002.xls" owner="client11@relay-server1.net" value="c:/FromFolder2/file002.xls"  126 (126d)
type="file" status="ok"/>
      </resource>
    </family-resource-info>
  </policy>
</user-account>
```

RELAY SERVER AND RELAY COMMUNICATION SYSTEM INCLUDING A RELAY GROUP INFORMATION REGISTRATION UNIT, A SHARED RESOURCE INFORMATION REGISTRATION UNIT, AND A CONTROL UNIT

CROSS-REFERENCE TO RELATED APPLICATIONS

This application claims priority under 35 U.S.C. 119 to Japanese Patent Application No. 2007-339673, filed on Dec. 28, 2007, which application is hereby incorporated by reference in its entirety.

BACKGROUND OF THE INVENTION

1. Field of the Invention

The present invention relates to a relay server and a relay communication system that enable automatic resource transfer via a network.

2. Description of the Related Art

A communication system referred to as a Virtual Private Network (VPN) is known in the conventional art. The VPN is used, for example, to provide communication over the Internet between terminals connected to a Local Area Network (LAN) of a plurality of branch offices (base points) located in separate regions. Through the VPN, each client terminal can share various resources (such as folders, files, etc.) held by devices connected to another LAN arranged in a remote location, and thus, the resources can be shared and transferred through the network.

Such systems as the VPN, however, tend to be rigid because the network is virtual. Therefore, it is not easy to establish a scalable and flexible system.

However, without the VPN, it is difficult to automatically transfer a file to a storage area of a terminal that belongs to another network.

SUMMARY OF THE INVENTION

In order to overcome the problems described above, preferred embodiments of the present invention enable automatic file transfer over a network by using another method other than the VPN.

A preferred embodiment of the present invention provides a relay server that includes a relay group information registration unit, a shared resource information registration unit, and a control unit. The relay group information registration unit stores information about a relay group including other relay servers that can be connected to the relay server. The shared resource information registration unit stores shared resource information when a resource is shared by a plurality of client terminals in the relay group. The shared resource information includes resource information and account information of the client terminal that shares the resource. The control unit includes a resource addition indicating unit, a transfer request relaying unit, and a deletion request relaying unit. The client terminal is arranged to monitor a specified monitoring-target folder. As a result, when the client terminal detects addition of a resource to the monitoring-target folder, and then adds information regarding the resource (resource information) to the shared resource information, the resource addition indicating unit indicates the change of the shared resource information in the shared resource information held by another client terminal. The client terminal is arranged to monitor the specified monitoring-target shared resource information. As a result, when the client terminal detects that the resource information has been added to the monitoring-target shared resource information, and then requests for transfer of the resource, the transfer request relaying unit relays the resource transfer request to the client terminal that belongs to the relay server and can handle the target resource, or to the relay server that is connected with the client terminal that can handle the target resource. When the resource is transferred to the client terminal that requested for the resource transfer, and then stored in a specified folder, and when the client terminal requests for deletion of the resource information from the monitoring-target shared resource information, the deletion request relaying unit relays the deletion request to the client terminal that belongs to the relay server, or to the relay server that is connected with the client terminal that can handle the resource.

Thus, the resource can be automatically transferred from the specified folder of one client terminal to the specified folder of another client terminal that belongs to another network.

In the relay server, it is preferable that the client terminal includes a plurality of folders as monitoring-target folders. When the resource is added to the monitoring-target folder, the client terminal adds the resource information to the specified shared resource information based on the monitoring-target folder to which the resource has been added. Then, the resource addition indicating unit of the relay server indicates the change of the shared resource information in the shared resource information held by the other client terminal.

Accordingly, the resource can be automatically distributed and transferred to the folder of the specified client terminal based on the folder to which the resource has been added.

In the relay server, it is preferable that when the resource is added to the monitoring-target folder, the client terminal adds the resource information to the specified shared resource information based on the added resource. Accordingly, the resource addition indicating unit of the relay server indicates the change of the shared resource information in the shared resource information held by the other client terminal.

Thus, the resource can be automatically distributed and transferred to the folder of the specified client terminal based on a type or other similar information of the added resource.

Another preferred embodiment of the present invention provides a relay communication system that includes a plurality of relay servers and a plurality of client terminals. The relay server includes a relay group information registration unit, a shared resource information registration unit, and a control unit. The relay group information registration unit stores information about a relay group including the other relay servers that can be connected with the relay server. The shared resource information registration unit stores shared resource information when a resource is shared by the plurality of client terminals in the relay group. The shared resource information includes resource information and account information of the client terminal that shares the resource. The control unit includes a resource addition indicating unit, a transfer request relaying unit, and a deletion request relaying unit. The client terminal is arranged to monitor a specified monitoring-target folder. As a result, when the client terminal detects addition of a resource to the monitoring-target folder, and then adds resource information to the shared resource information, the resource addition indicating unit indicates the change of the shared resource information in the shared resource information held by another client terminal. The client terminal is arranged to monitor the specified monitoring-target shared resource information. As a result, when the client terminal detects that the resource information has been added to the monitoring-target shared resource information, and then requests for transfer of the resource, the transfer request relaying unit relays the resource transfer request to the client terminal that belongs to the relay server and can handle the target resource, or to the relay server that is connected with the client terminal that can handle the target resource. When the resource is transferred to the client terminal that requested for the resource transfer, and then stored in a specified folder, and when the client terminal requests for deletion of the resource information from the monitoring-target shared resource information, the deletion request relaying unit relays the deletion request to the client terminal that belongs to the relay server, or to the relay server that is connected with the client terminal that can handle the resource.

Thus, the resource can be automatically transferred from the specified folder of one client terminal to the specified folder of another client terminal that belongs to another network.

In the relay communication system, when the information regarding the resource that can be handled by the client terminal is deleted from the shared resource information, it is preferable that the client terminal deletes the resource.

Thus, files can be automatically moved (transferred) among the different networks.

In the relay communication system, it is preferable that at least one of the client terminal that requested the resource transfer and the client terminal that received the request can issue a notification of a transfer result.

Accordingly, a user can learn that the file has been transferred, or that the process has been normally completed or erroneously completed.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 6 illustrates an example of the content of relay group information according to a preferred embodiment of the present invention.

FIG. 7 illustrates an example of the content of shared resource information according to a preferred embodiment of the present invention.

DETAILED DESCRIPTION OF PREFERRED EMBODIMENTS

Figure 1:
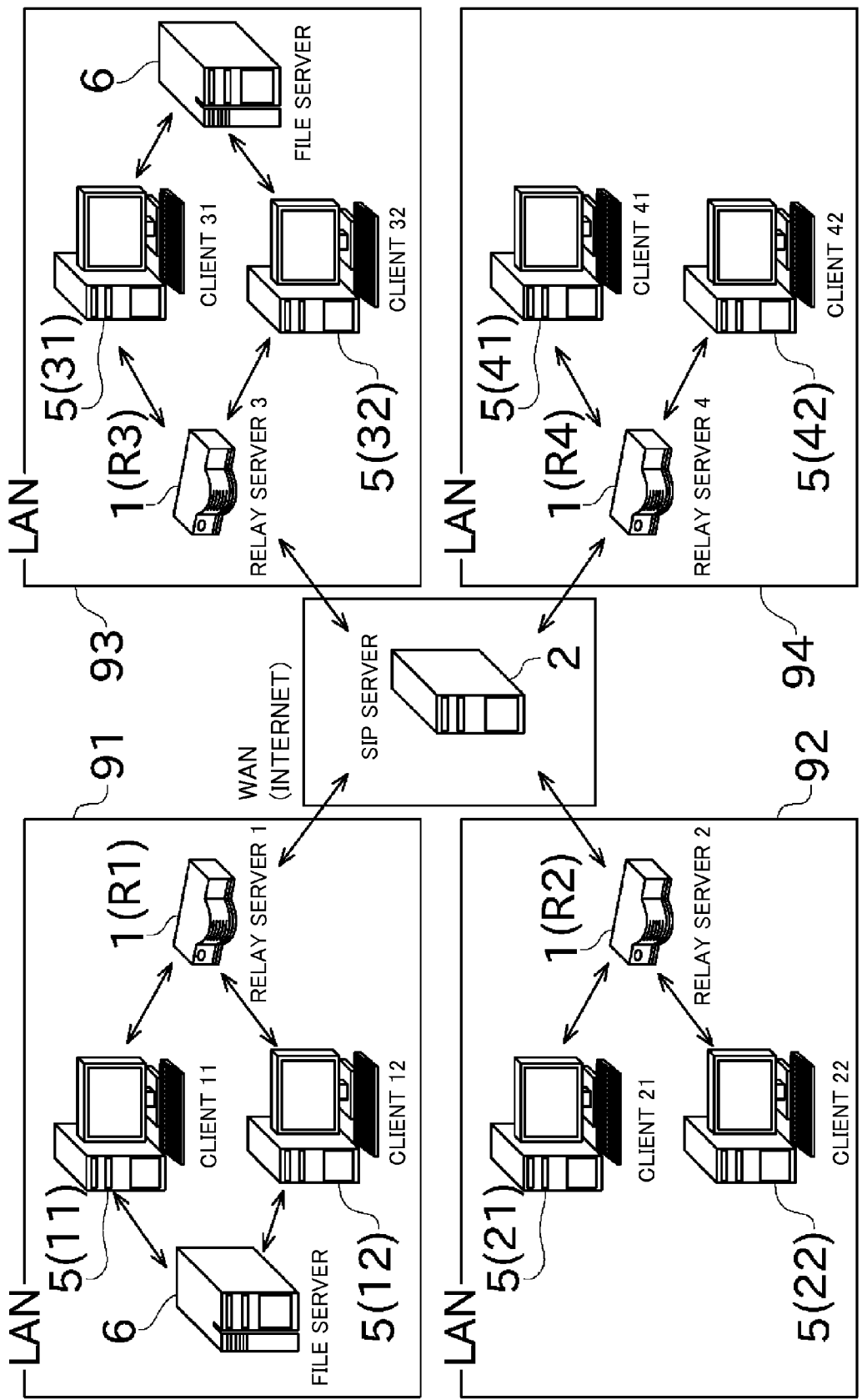
FIG. 1 is a network configuration diagram of a relay communication system according to a preferred embodiment of the present invention.

Preferred embodiments of the present invention are described with reference to the drawings. FIG. 1 illustrates an overall configuration of a relay communication system according to a preferred embodiment of the present invention.

As illustrated in FIG. 1, the relay communication system of the present preferred embodiment includes a plurality of LANs connected to a Wide Area Network (WAN). The relay communication system includes relay servers 1, an external server 2, client terminals 5, and file servers 6, and other similar devices.

The WAN is a network that connects different LANs to each other. In the present preferred embodiment, the Internet is preferably used as the WAN. However, other suitable networks could also be used.

The LAN is a relatively small-scale network provided in a limited location. There are a plurality of LANs, each of which is provided at a location that is physically remote form the other locations. In the present preferred embodiment, a LAN 91 is provided at, for example, a Tokyo branch office, and LANs 92, 93, 94 are respectively provided at, for example, an Osaka branch office, a Nagoya branch office, and a Fukuoka branch office. The four LANs 91, 92, 93, 94 are respectively connected to the Internet, which is a global network.

Figure 2:
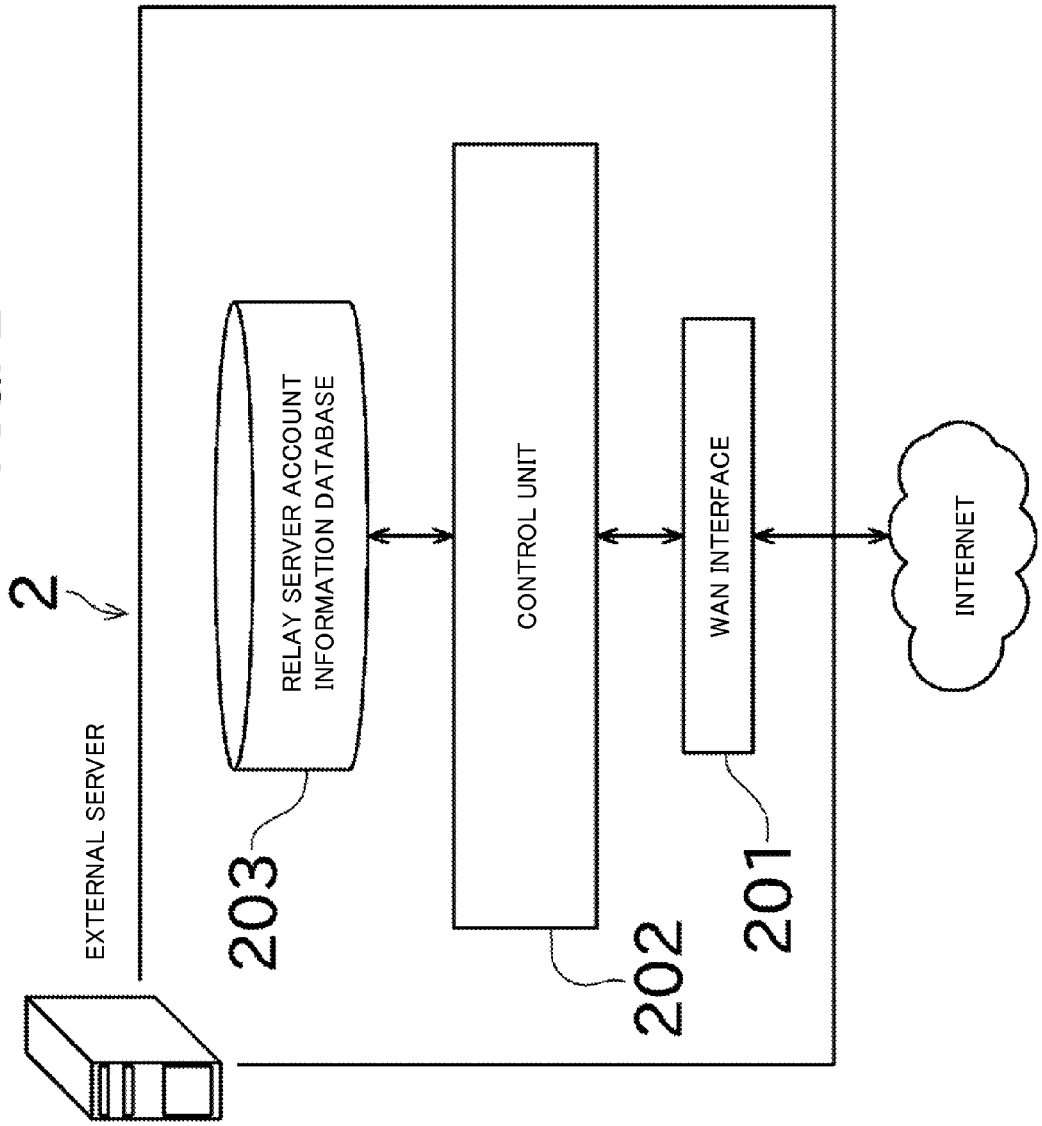
FIG. 2 is a functional block diagram of an external server according to a preferred embodiment of the present invention.

The external server 2 will now be described with reference to FIG. 2. FIG. 2 is a functional block diagram of the external server 2. The external server 2 is a device that is connected to the Internet and that facilitates the communication performed between the relay servers 1 that are each arranged in the respective LANs. The external server 2 illustrated in FIG. 2 provides the function of a Session Initiation Protocol (SIP) server. Specifically, the external server 2 provides the function of an SIP proxy server for relaying SIP methods and responses, etc. and provides the function of an SIP registrar server for registering an account of the relay server 1.

As illustrated in FIG. 2, the external server 2 preferably includes a WAN interface 201, a control unit 202, and a relay server account information database 203 as a primary configuration.

The WAN interface 201 is an interface arranged to communicate with each device, such as the relay server 1, connected to the Internet by using a global IP address.

The relay server account information database 203 is a database that manages, in association with the global IP address, the account of the relay server 1 that has made a registration request.

The control unit 202 is a processing unit that controls various communications performed through the WAN interface 201 and that controls the communication processes complying with such protocols as Transmission Control Protocol/

Internet Protocol (TCP/IP), User Datagram Protocol (UDP), and SIP. The control unit 202 performs, for example, a process of receiving the account of the relay server 1 from each relay server 1 and a process of registering the received account in the relay server account information database 203. Moreover, the control unit 202 performs, for example, a process of relaying communication data, such as various SIP methods and responses, transmitted from the relay server 1 to the other relay servers 1.

The client terminal 5 will now be described with reference to FIG. 3, which is a functional block diagram of the client terminal 5.

The client terminal 5 is a terminal that can be directly operated by a user and that includes a Personal Computer (PC) or other similar device used by the user, for example, on a daily basis. Accordingly, a great number of client terminals 5 can exist in the LAN. In the present preferred embodiment, as illustrated in FIG. 1, the client terminals 11, 12 are connected to the LAN 91, the client terminals 21, 22 are connected to the LAN 92, the client terminals 31, 32 are connected to the LAN 93, and the client terminals 41, 42 are connected to the LAN 94. Each client terminal 5 is provided with a private IP address that is uniquely managed in the same LAN.

Figure 3:
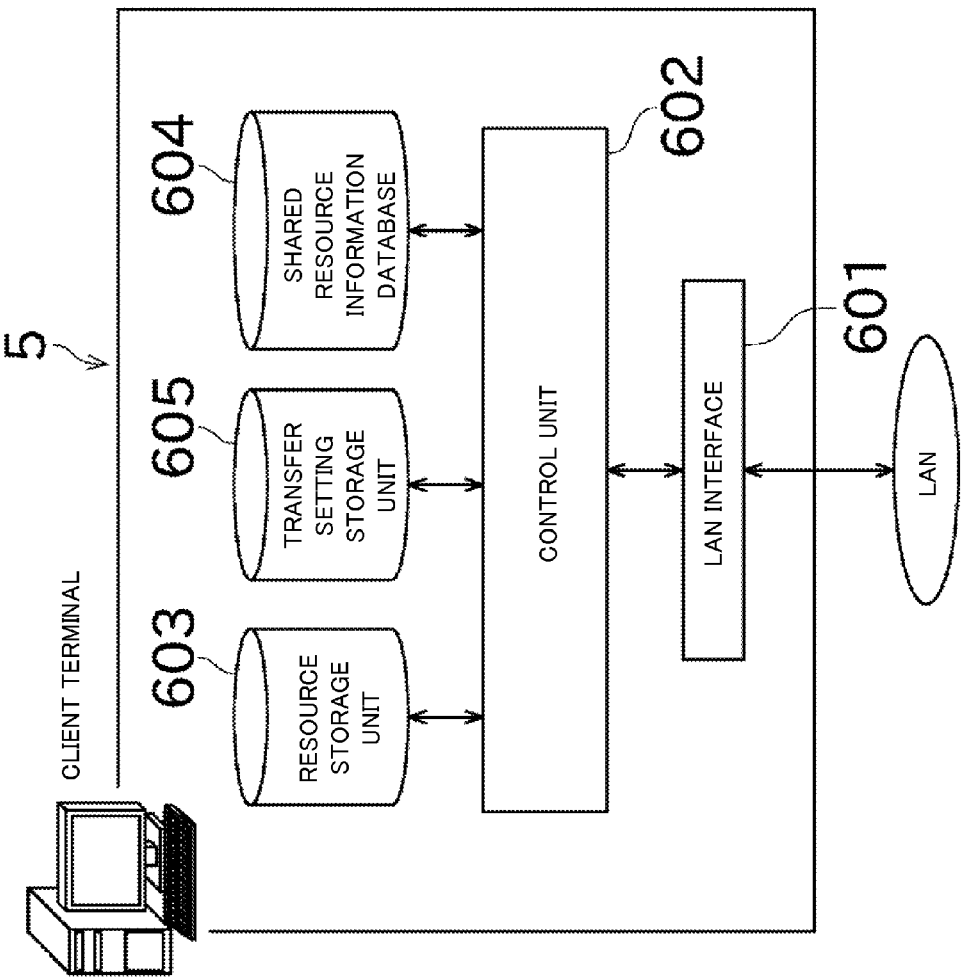
FIG. 3 is a functional block diagram of a client terminal according to a preferred embodiment of the present invention.

As illustrated in FIG. 3, the client terminal 5 preferably includes a LAN interface 601, a control unit 602, a resource storage unit 603, a shared resource information database 604, and a transfer setting storage unit 605 as a primary configuration.

The LAN interface 601 is an interface arranged to communicate with the other devices, such as the relay server 1 and the file server 6 connected to the same LAN, by using the private IP address.

The resource storage unit 603 stores resources, such as files, folders, etc., that can be handled by the client terminal 5.

The shared resource information database 604 stores shared resource information held by each client terminal 5.

The transfer setting storage unit 605 stores various settings that are used to transfer the resources by using the relay communication system of the present preferred embodiment. The various settings are preferably used when the client terminal 5 is operated as a resource transfer source and/or as a resource transfer destination. The setting information used when the client terminal 5 is operated as the resource transfer source includes (1) information indicating a location of a folder that is monitored for detecting a resource to be transferred, and (2) information indicating, when the resource to be transferred is detected, the shared resource information to which the resource to be transferred is added as the shared resource, or other similar information. Setting information used when the client terminal 5 is operated as the resource transfer destination includes (1) information indicating the shared resource information to be monitored for detecting the resource to be transferred, and (2) information indicating a location of a folder in which actual data is stored when a transfer target resource is received from the transfer source client terminal 5 via the relay server 1, or other similar information.

The control unit 602 is a processing unit that controls various communications performed through the LAN interface 601. The control unit 602 controls communication processes complying with protocols such as TCP/IP, UDP, and SIP.

The control unit 602 performs, for example, a process of controlling the handling such as transfer, change, and/or deletion of the resources stored in the resource storage unit 603. The control unit 602 also performs a process of updating the shared resource information stored in the shared resource information database 604 when a change notification of the shared resource information is received from the relay server 1. When the client terminal 5 is operated as the resource transfer source, in accordance with the settings of the transfer setting storage unit 605, the control unit 602 performs a process of monitoring the content of a specific folder and performs a process of adding to the shared resource information the resource added to the folder, or other similar device. Further, when the client terminal 5 is operated as the resource transfer destination, in accordance with the settings of the transfer setting storage unit 605, the control unit performs a process of monitoring the content of the specific shared resource information and performs a process of issuing a request for transfer of the resource when the resource is added to the shared resource information.

The relay server 1 will now be described with reference to FIG. 4, which is a functional block diagram of each relay server 1.

As illustrated in FIG. 1, one relay server 1 is arranged in each LAN. Specifically, a relay server R1 is arranged in the LAN 91, a relay server R2 is arranged in the LAN 92, a relay server R3 is arranged in the LAN 93, and a relay server R4 is arranged in the LAN 94.

The relay server 1 is connected to the LAN and can communicate with each client terminal 5 that is connected to the same LAN. The relay server 1 is also connected to the Internet and can communicate (through the external server 2) with the relay servers 1 that are connected to the other LANs. In order to permit such communication, each relay server 1 is provided with both a private IP address and a global IP address.

The relay server 1 preferably includes a LAN interface 501, a WAN interface 502, a control unit 503, an account information database 504, a relay group information database 505, and a shared resource information database 506 in a primary configuration.

The LAN interface 501 is an interface arranged to communicate with the client terminal 5 connected to the same LAN (i.e., the LAN to which the relay server 1 is connected) by using the private IP address. For example, the relay server R1 can communicate with each of the client terminals 11, 12 in the LAN 91 by using the LAN interface 501.

The WAN interface 502 is an interface arranged to communicate with each device, such as the external server 2 connected to the Internet, by using the global IP address.

Each relay server 1 provides the function of a SIP registrar server and communicates with each client terminal 5 by using a SIP. For example, in the LAN 92, the relay server R2 functions as a SIP registrar server, receives an account of each client terminal 21, 22 connected to the LAN 92 and registers the received accounts in the account information database 504.

Figure 5:
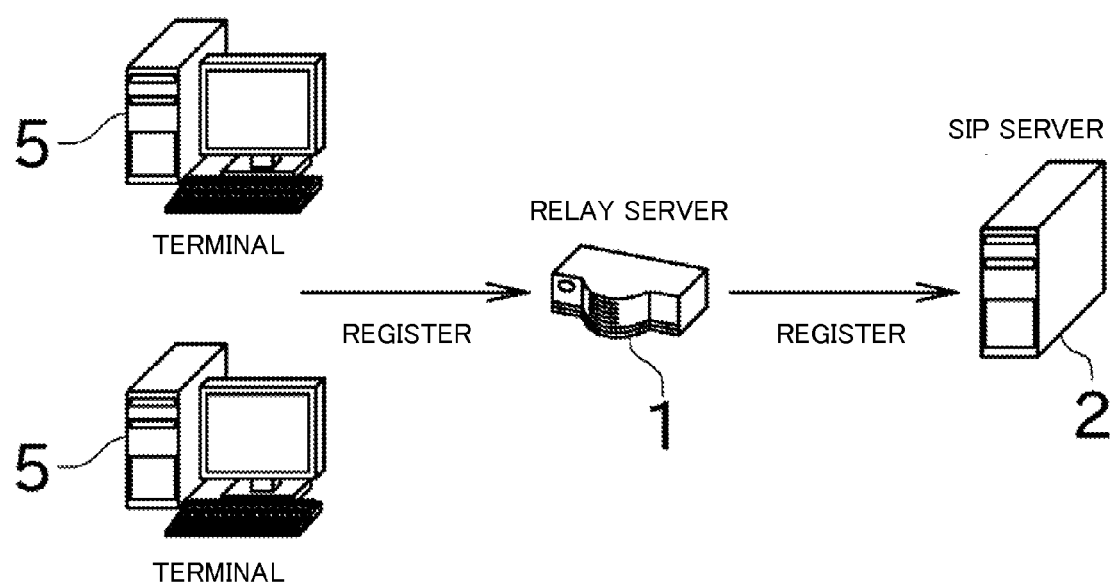
FIG. 5 illustrates the relationship among the client terminal, the relay server, and the external server according to a preferred embodiment of the present invention.

Accordingly, as illustrated in FIG. 5, in the relationship with the client terminal 5, the relay server 1 functions as a server that receives the account from the client terminal 5 and registers (REGISTER) the account. In the relationship with the external server 2, the relay server 1 functions as a client that transmits the account to the external server 2 and registers (REGISTER) the account.

Figure 4:
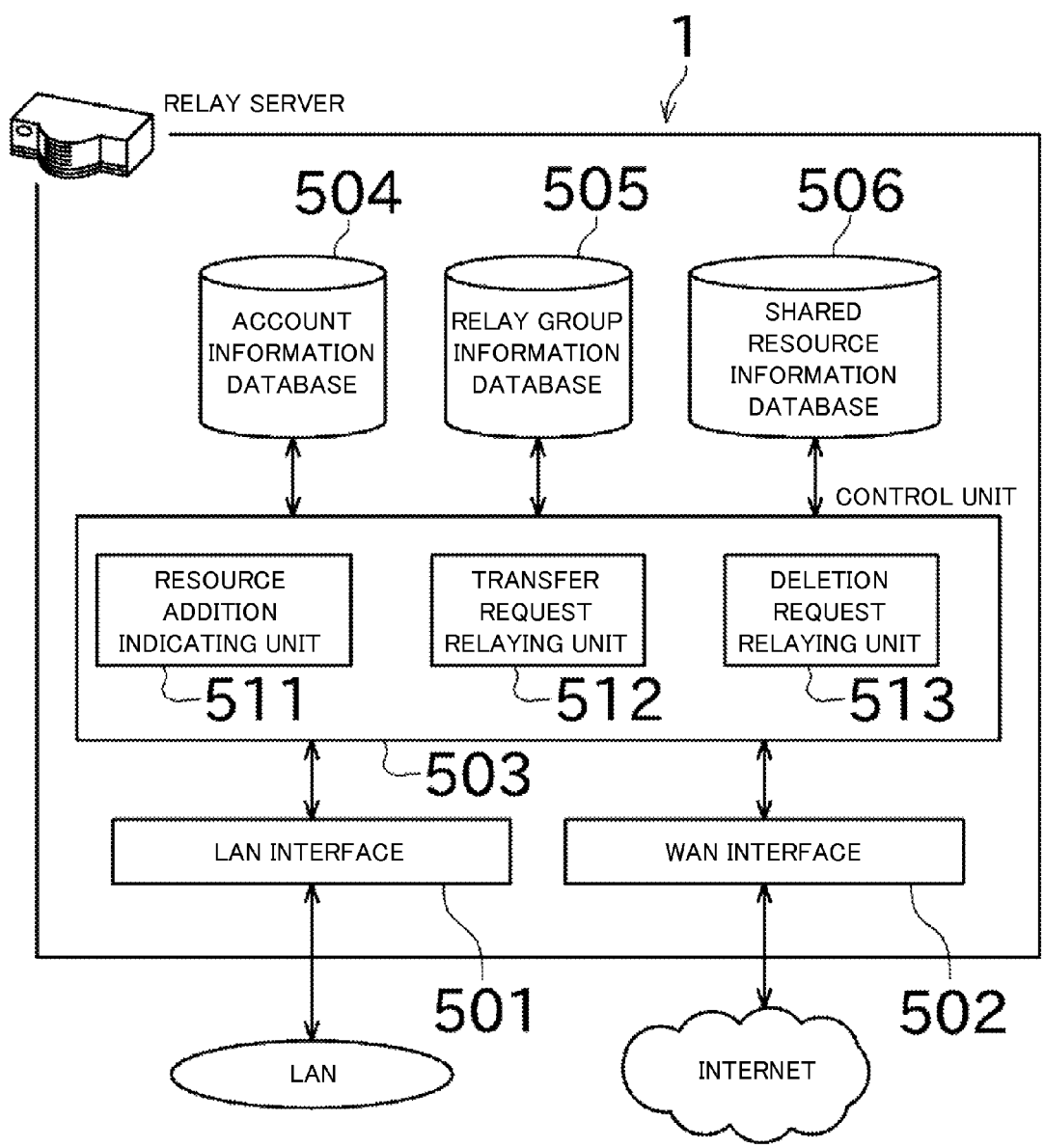
FIG. 4 is a functional block diagram of a relay server according to a preferred embodiment of the present invention.

The account information database 504 of FIG. 4 is a database that manages, in association with the private IP address, the account of the client terminal 5 that has made a registration request.

The relay group information database (relay group information registration unit) 505 is preferably a database that manages the relay group information related to the client terminal 5 registered in the account information database 504.

The shared resource information database (shared resource information registration unit) 506 is preferably a database that manages the shared resource information related to the client terminal 5 registered in the account information database 504.

The control unit 503 is preferably a processing unit that controls various communications performed through the LAN interface 501 and the WAN interface 502, and controls various communication processes complying with protocols such as TCP/IP, UDP, SIP, etc.

For example, the control unit 503 performs a process of transmitting an account thereof to the external server 2 and requesting for registration of the account and performs a process of creating the relay group information to store in the relay group information database 505. The control unit 503 also performs a process of creating the shared resource information to store in the shared resource information database 506.

Further, the control unit 503 includes a resource addition indicating unit 511, a transfer request relaying unit 512, and a deletion request relaying unit 513.

When it is notified by the client terminal 5 that resource information has been added to the shared resource information, the resource addition indicating unit 511 transmits an instruction to other client terminals 5 to add the resource information.

When a request for transfer of a resource is received from the client terminal 5, the transfer request relaying unit 512 relays the transfer request to the client terminal 5 that can handle the resource (or to the relay server 1 to which such client terminal 5 belongs).

When a request for deletion of a specified resource information from the shared resource information is received from the client terminal 5, the deletion request relaying unit 513 relays the deletion request to the other client terminals 5 (or to the relay server(s) 1 to which the other client terminals 5 belong).

The file server 6 will now be described. As illustrated in FIG. 1, the file server 6 is connected to the LAN and can communicate with each client terminal 5 connected to the same LAN.

The file server 6 can store resources such as files, folders, etc. and functions as a resource storage unit alternative to the resource storage unit 603 (shown in FIG. 3) of each client terminal 5. In other words, in the present preferred embodiment, the resource that can be handled by each client terminal 5 (including transfer-target resources) can be stored in a local disc of the corresponding client terminal 5 and/or in the file server 6 provided as a network drive. The file server 6 is not necessarily required in each LAN, and the installation thereof is omitted in the LANs 92 and 94 (shown in FIG. 1).

The relay group information and the shared resource information, which are information handled in the relay communication system of the present preferred embodiment, will now be described.

First, the relay group information is described with reference to FIG. 6, which illustrates an example of content of the relay group information.

FIG. 6 illustrates an example of the storage content of the relay group information database 505 of the relay server R1. In this example, relay group information 100a and 100b are stored in the relay group information database 505.

Each of the relay group information 100a and 100b includes group identification information 101, information (relay account information) 102 (102a, 102b, 102c) of the relay server 1 that forms a relay group by enabling connection with one another, and resource sharable terminal information 110.

The group identification information 101 is used to identify the corresponding relay group information 100 and is given a different identification ID each time the relay group information 100 is created to be uniquely identified. Thus, an operator (the user) can specify the relay group based on the group identification information 101 and can easily change a group configuration.

The relay account information 102 includes information about the account of each relay server 1 that forms a relay group by enabling the connection with one another. For example, in the relay group information 100a illustrated on an upper side of FIG. 6, the accounts of the relay servers R1, R2, and R3 that form a relay group are described. In the relay group information 100b illustrated on a lower side of FIG. 6, the accounts of the relay servers R1 and R2 that form another relay group is described.

A specific name that is given to the account of each relay server 1 is also registered in the relay account information 102 to allow the user to easily identify the different accounts. For example, in relay account information 102a of the relay server R1 (relay-server 1), a name (branch office A) is given to the account (relay-server1@net) of the relay server R1.

As described above, the relay group information 100a and 100b are created such that they can be uniquely identified with respect to each relay group. Each of the relay group information 100a and 100b includes the account (relay account information 102) of each relay server that forms a group (relay group) by enabling the connection with one another. Accordingly, by referring to the relay group information 100a and 100b, the operator or the user can recognize which LANs form a group.

The resource sharable terminal information 110 that can be included in the relay group information 100 will now be described.

As illustrated in FIG. 6, the resource sharable terminal information 110 is registered in association with each piece of relay group information 100. For example, resource sharable terminal information 110a is registered in association with the relay group information 100a, and resource sharable terminal information 110b is registered in association with the relay group information 100b.

Each of the resource sharable terminal information 110a and 110b includes individual terminal information 111 describing the client terminal 5 that can share the resource in the corresponding relay group of the relay group information 100a or 100b. The account of each client terminal 5 that can share the resource is described in the individual terminal information 111.

For example, the relay group information 100a corresponding to the resource sharable terminal information 110a illustrated on the upper side of FIG. 6 defines the relay group that is formed by the relay servers R1, R2, and R3. As illustrated in FIG. 1, the client terminals 11 and 12 are arranged in the LAN 91 to which the relay server R1 is connected. In the example of the resource sharable terminal information 110a illustrated on the upper side of FIG. 6, the two client terminals 11 and 12 are selected as the terminals that can share the resource in the relay group, and account information of each terminal 11, 12 is registered as the individual terminal information 111. Similarly, the client terminals 21 and 22 are selected as the resource sharable terminals in the LAN 92 to which the relay server R2 is connected. Although the client terminals 31 and 32 are arranged in the LAN 93 to which the relay server R3 is connected, in the present example, in the resource sharable terminal information 110a, only the client terminal 31 is selected as the resource sharable terminal, and account information thereof is registered as the individual terminal information 111.

In addition to the account of each resource sharable terminal, a specific name given to the account is registered in the individual terminal information 111 so that it can be easily identified by the user. For example, in the case of client terminal 11, a name (client 11) given to the account thereof (for example, client11@relay-server1.net) is described. Moreover, belonging identification data 112 indicating belonging of the resource sharable terminal, such as a sales division and a development division, is described in the individual terminal information 111.

In the resource sharable terminal information 110, each individual terminal information 111 is described in association with the relay account information 102 of the relay server 1 connected to the LAN to which the resource sharable terminals are connected. For example, the individual terminal information 111 related to the client terminal 11 is described in association with the relay account information 102a of the relay server R1.

As illustrated in FIG. 6, the relay group information database 505 can store a plurality of relay group information 100 and a plurality of resource sharable terminal information 110. In both the resource sharable terminal information 110a and 110b of the two relay groups, the client terminals 11 and 12 are the resource sharable terminals, and the corresponding individual terminal information 111 is described. Accordingly, one client terminal 5 can be selected as the resource sharable terminal in a plurality of relay groups, and the resource sharable terminal information 110 indicating that the one client terminal can be the resource sharable terminal in the plurality of relay groups can be stored in the relay group information database 505.

Each piece of relay group information 100 is exchanged among the relay servers 1 that form the corresponding relay group. For example, the relay group information 100a illustrated on the upper side of FIG. 6 is exchanged among the three relay servers R1, R2, and R3 and is stored in the relay group information database 505 of each relay server R1, R2, and R3. The relay group information 100b illustrated on the lower side of FIG. 6 is exchanged between the relay servers R1 and R2 and is stored in the relay group information database 505 of each relay servers R1 and R2.

The content of the shared resource information will now be described with reference to FIG. 7. FIG. 7 illustrates an example of shared resource information 120 stored in the shared resource information database 604 of the client terminal 11. The same shared resource information 120 is also stored in the shared resource information database 506 of the relay server R1 that is connected to the same LAN to which the client terminal 11 is connected.

The shared resource information 120 is described, for example, in an Extensible Markup Language (XML) format as illustrated in FIG. 7. The shared resource information 120 includes account identification information 121 indicating that the information 120 is the shared resource information that is related to the client terminal 11 and is the individual shared resource information 122.

Because the shared resource information 120 is created with respect to each client terminal 5, the account identification information 121 is used to identify the created shared resource information 120.

The individual shared resource information 122 includes shared resource identification information 123, family account information 124 (124a, 124b), and family resource information 125, etc. In the example of FIG. 7, individual shared resource information 122a and 122b are described.

The shared resource identification information 123 is used to identify the individual shared resource information 122 thereof and can be uniquely identified by being given a different ID each time the individual shared resource information 122 is created. The shared resource identification information 123 includes (1) an ID that is associated with the client terminal 5 that has made a request for creating the shared resource information 120 and (2) a name that is used to identify the ID easily. For example, the ID can be "20071001150032client11@relay-server1" or other similar identifier, and the name for easily performing the identification can be "workspace1" or other similar name.

Thus, the user can specify the shared resource information based on the shared resource identification information 123 and thus can edit the content of the shared resource information easily.

The family resource information 125 includes collections of resource information 126 indicating resources such as files and folders (directory) held by the client terminal 5.

Each resource information 126 (126a, 126b, 126c, 126d) includes name information of a resource to be shared (i.e., a shared resource), account information of the client terminal 5 (owner client terminal) that can handle the resource, address information indicating the location of the resource, information about the type of the resource, and status information of the resource.

A name of the shared resource is given to the resource when the resource is shared by a plurality of client terminals 5 and can be described as follows, for example: name="FromFolder". In the account information of the owner client terminal, an account for identifying the owner client terminal is described as follows, for example: owner="client11@relay-server1.net". An address indicating the location of the resource indicates the location in which the shared resource is actually stored in the resource storage unit 603 (or the file server 6) and can be described by using a full path as follows, for example: value="c:/FromFolder". The information about the type of the resource indicates whether the resource is a file or a folder and can be described as follows, for example: type="folder". The status information indicates the status of the resource and can be described as follows, for example: status="OK".

As illustrated in FIG. 7, the resource information 126 can indicate either a folder or a file. In the example of FIG. 7, an XML tag indicating the resource information 126 of a file is a child element (subelement) of an XML tag indicating the resource information 126 of a folder. For example, resource information 126b, which indicates a file "file001.pdf", is a child element of resource information 126a, which indicates the folder "FromFolder".

As described above, the hierarchical structure information is described in the shared resource information 120 by using the relationship between a parent element and the child element of an XML according to the present preferred embodiment. Accordingly, a hierarchical structure of the shared resources including the files and folders is established (represented). By using the hierarchical structure of the resources, the files and folders (i.e., shared resources) can be shared in an organized state in accordance with the usage and purpose of the resources.

The family account information 124 includes collections of information about accounts (for example, client11@relay-server1.net) of the client terminals 5 that share the resources indicated in the family resource information 125.

In the example of the resource information 126b of FIG. 7, the owner client terminal is the terminal 11. The client terminals (user client terminals) that can handle the resource indirectly via the owner client terminal 11 are the client terminals other than the owner client terminal 11 that are described in family account information 124a. That is, the client terminal 21 is the user client terminal in this example.

A plurality of resource information 126 can be described in the family resource information 125, and the owner client terminal described in each resource information 126 can be different from one another. Accordingly, the relationship between the owner client terminal and the user client terminals is not fixed, and any client terminal described in the family account information 124 can be the owner client terminal. In the following description, the client terminal described in the family account information 124 can be referred to as a sharing member terminal.

Each of the client terminals 11 and 12, which are the sharing member terminals in the example of the individual shared resource information 122a of FIG. 7, is connected to the LAN to which any of the relay servers R1, R2, and R3, which form the relay group described in the relay group information 100a of FIG. 6, is connected. In the resource sharable terminal information 110a of the relay group, each sharing member terminal corresponds to the client terminal that has the individual terminal information 111 thereof described as the resource sharable terminal. Thus, the resource is shared by any client terminals that are in the same relay group.

Each sharing member terminal stores in the shared resource information database 604 the shared resource information having the above-described content.

Figure 8:
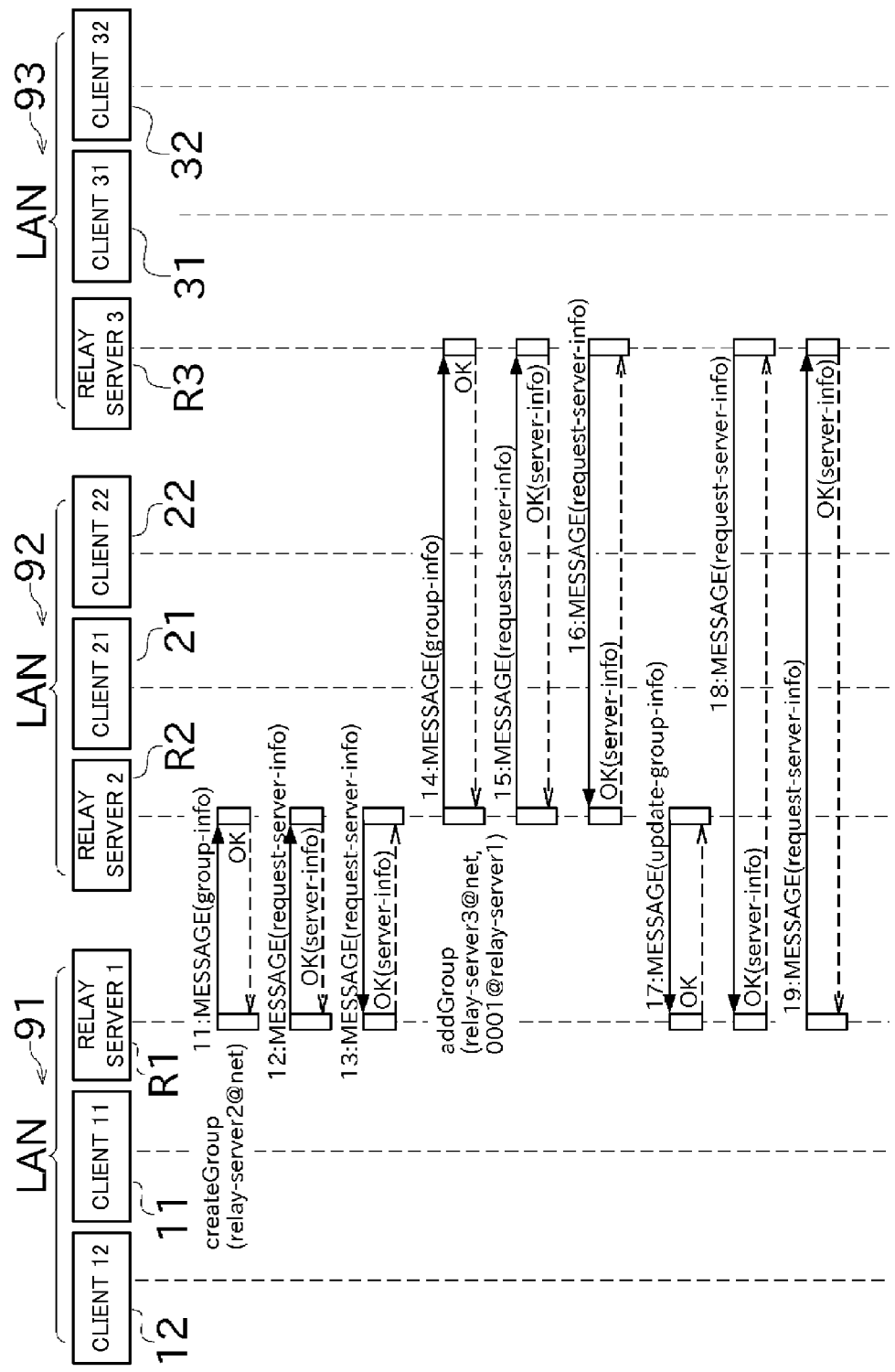
FIG. 8 is a sequence chart illustrating a communication process in which a relay group is created according to a preferred embodiment of the present invention.

With reference to sequence numbers 11 through 19 of FIG. 8, generation steps and registration steps of the relay group are described. Processes of sequence numbers 11 through 19 of FIG. 8 are generally performed as initial settings of the network by the user or the operator.

First, in the relay server R1, a method (createGroup method) for newly forming a relay group with the relay server R2 is executed by the operator. In the createGroup method, an account (relay-server2@net) of the relay server R2 with which the relay group is formed is specified.

Accordingly, the relay group information 100a is newly created in the relay server R1. At this time, an identification ID (0001@relay-server1) is given to the corresponding relay group information and described in the group identification information 101.

Then, a message transmission command (MESSAGE method) is executed in the relay server R1, and a "group-info message" with respect to the relay server R2 is transmitted to the external server 2 (sequence number 11) (transmission to external server 2 is not shown in FIG. 8). The message includes the identification ID of the relay group information created in the "createGroup method", or suitable identification information.

An account (sip:relay-server2@net) of the relay server R2, which is a message transmission destination, is specified in the MESSAGE method. By referring to the relay server account information database 203, the external server 2 acquires the global IP address of the relay server R2 and relays the "group-info message" from the relay server R1 to the relay server R2. Having received the message, the relay server R2 returns an "OK" response to the relay server R1 via the external server 2.

As described above, the communication between each relay server 1 in the present preferred embodiment is performed via the external server 2, and the same is applied to the following description. Accordingly, in the following description, specific descriptions of the communication process performed via the external server 2 are omitted and not shown in the drawings.

Next, the relay server R1 transmits a message requesting the transmission of server information (request-server-info message) to the relay server R2 (sequence number 12). Having received the message, the relay server R2 returns an "OK" response and information (server-info) related thereto to the relay server R1.

Conversely, the relay server R2 transmits a "request-server-info message" to the relay server R1 (sequence number 13), and the relay server R1 returns information (server-info) related thereto to the relay server R2.

Thus, by exchanging each of the server information, both the information related to the relay server R1 and the information related to the relay server R2 are described in the relay account information 102 of the relay group information 100 and are stored in the relay group information database 505 of each relay server R1 and R2.

Next, a method (addGroup method) in which the relay server R3 is newly added to the previously created relay group (i.e., the relay group formed by the relay servers R1 and R2) is performed in the relay server R2 by the operator or the user. An account (relay-server3@net) of the relay server R3 to be added and the identification ID (0001@relay-server1) of the relay group to which the relay server R3 will be added are specified in the "addGroup method".

Then, the relay server R2 transmits a "group-info message" to the relay server R3 to be added (sequence number 14). The message includes the identification ID of the relay group specified in the "addGroup method", or suitable information. Having received the message, the relay server R3 returns an "OK" response to the relay server R2. Then, similarly to the descriptions in sequence numbers 12, 13, server information is exchanged between the relay servers R2 and R3 (sequence numbers 15, 16).

The relay server R2 transmits to the relay server R1 an "update-group-info message" notifying that the relay server R3 has been added to the relay group (sequence number 17). Having received the message, the relay server R1 returns an "OK" response to the relay server R2. Then, the server information is exchanged between the relay servers R3 and R1 (sequence numbers 18, 19).

Thus, the relay group information 100 (i.e., information having the content of the relay group information 100a of FIG. 6) indicating that the relay servers R1, R2, and R3 form the relay group is stored in the relay group information database 505 of each relay server R1, R2, and R3.

Although not illustrated in FIG. 8, a "createGroup method" in which the relay server R2 is specified as a relay server that forms another relay group is further executed in the relay server R1. The subsequent processes thereof are similar to the processes described above. As a result, the relay group information 100b formed by the relay servers R1 and R2 is created, and an identification ID (0002@relay-server2) is given and stored in the relay group information database 505 of each relay server R1 and R2.

Figure 9:
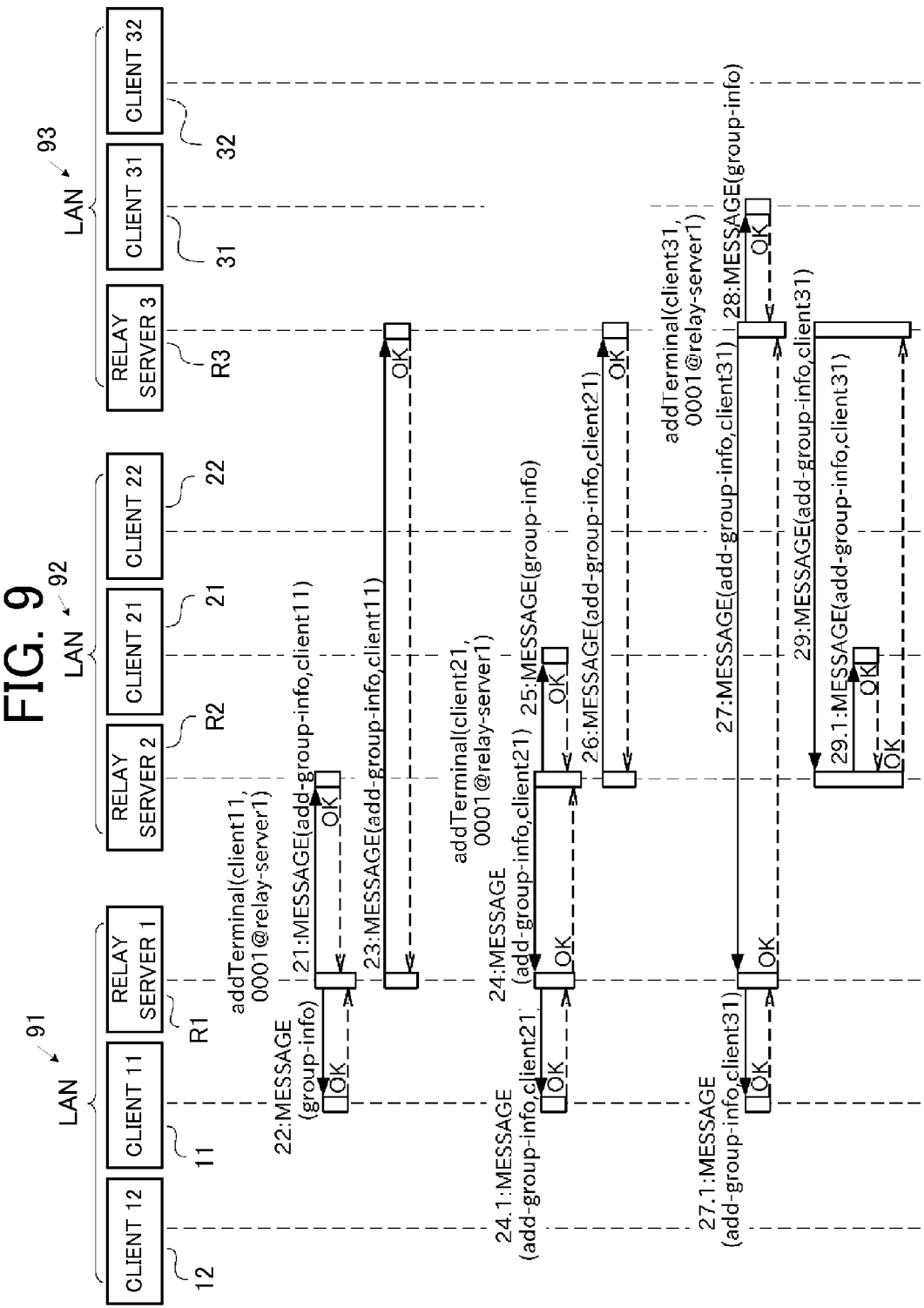
FIG. 9 is a sequence chart illustrating a communication process in which the client terminal is registered in the relay group as a resource sharable terminal according to a preferred embodiment of the present invention.

Next, with reference to sequence numbers 21 through 29 of FIG. 9, registration steps of the resource sharable terminals with respect to the relay group are described.

In the relay server R1, a method (addTerminal method) in which the client terminal 11 is registered as the resource sharable terminal in the relay group formed by the relay servers R1, R2, and R3 is executed by the operator or the user. The account of the client terminal 11 and the identification ID (0001@relay-server1) indicating the registration destination relay group are specified in the "addTerminal method".

When the "addTerminal method" is executed, the relay server R1 searches the relay group information database 505 thereof. Then, the relay server R1 adds the individual terminal information 111 of the client terminal 11 to the resource sharable terminal information 110 that corresponds to the relay group information of the specified identification ID.

Then, the relay server R1 immediately specifies the relay group information 100 from the storage content of the relay group information database 505 by using the identification ID and searches for the relay servers 1 that form the relay group. As a result, it is determined from the relay group information 100a of FIG. 6 that the relay group is formed by the relay servers R1, R2, and R3.

Accordingly, the relay server R1 transmits to the relay server R2 an "add-group-info message" requesting for addition of the resource sharable terminal to the relay group (sequence number 21). The message includes the account of the client terminal 11 to be added and the identification ID of the registration destination relay group, or other similar information. Having received the message, the relay server R2 adds the individual terminal information 111 of the client terminal 11 to the resource sharable terminal information 110 stored in the relay group information database 505, and then returns an "OK" response.

Then, the relay server R1 transmits a "group-info message" to the client terminal 11 (sequence number 22). The message includes the resource sharable terminal information 110 to which the individual terminal information 111 of the client 11 is added. Having received the message, the client terminal 11 then stores the content of the received resource sharable terminal information 110 in a suitable storage unit.

Subsequently, the relay server R1 also transmits to the relay server R3 the "add-group-info message" requesting for the addition of the resource sharable terminal to the relay group (sequence number 23). Having received the message, the relay server R3 adds the individual terminal information 111 of the client terminal 11 to the resource sharable terminal information 110 stored in the relay group information database 505, and then returns an "OK" response.

Thus, the individual terminal information 111 of the client terminal 11 is registered as the resource sharable terminal in the resource sharable terminal information 110 of the relay group information 100 stored in the relay group information database 505 of each relay server R1, R2, and R3.

Next, in the relay server R2, a method (addTerminal method) in which the identification ID of the relay group is specified and in which the client terminal 21 is registered as the resource sharable terminal is executed by the operator.

The relay server R2 searches the relay group information database 505 thereof and adds the individual terminal information 111 of the client terminal 21 to the resource sharable terminal information 110 that corresponds to the relay group information specified by using the identification ID.

Then, the relay server R2 transmits to the relay server R1 an "add-group-info message" requesting the addition of the resource sharable terminal to the relay group (sequence number 24). The message includes the account of the client terminal 21 to be added and the identification ID of the registration destination relay group, or other similar information.

Having received the message, the relay server R1 adds the individual terminal information 111 of the client terminal 21 to the resource sharable terminal information 110 stored in the relay group information database 505. Further, the relay server R1 transmits an "add-group-info message" to the client terminal 11, which is connected to the same LAN and has already been stored as the resource sharable terminal (sequence number 24.1). Having received the message, the client terminal 11 stores the individual terminal information 111 of the client terminal 21 in a suitable storage unit. Then, the client terminal 11 returns an "OK" response to the relay server R1. Having received the response, the relay server R1 returns an "OK" response to the relay server R2.

Furthermore, the relay server R2 transmits a "group-info message" to the client terminal 21 (sequence number 25). The message includes the resource sharable terminal information 110 to which the individual terminal information 111 of each client terminal 11 and 21 is added. Having received the message, the client terminal 21 stores the content of the received resource sharable terminal information 110 in a suitable storage unit.

Subsequently, the relay server R2 also transmits to the relay server R3 the "add-group-info message" requesting the addition of the resource sharable terminal to the relay group (sequence number 26). Having received the message, the relay server R3 adds the individual terminal information 111 of the client terminal 21 to the resource sharable terminal information 110 stored in the relay group information database 505, and then returns an "OK" response.

Thus, the individual terminal information 111 of each client terminal 11 and 21 has been registered as the resource sharable terminal in the resource sharable terminal information 110 of the relay group information 100 stored in the relay group information database 505 of each relay server R1, R2, and R3.

Next, in the relay server R3, a method (addTerminal method) in which the identification ID of the relay group is specified, and the client terminal 31 is registered as the resource sharable terminal, is executed by the operator.

Then, the relay server R3 searches the relay group information database 505 thereof and adds the individual terminal information 111 of the client terminal 31 to the resource sharable terminal information 110 related to the relay group specified by using the identification ID.

Further, the relay server R3 transmits, to the relay server R1, an "add-group-info message" requesting for addition of the resource sharable terminal to the relay group (sequence number 27). The message includes an account of the client terminal 31 to be added and the identification ID of the registration destination relay group, or suitable information.

Having received the message, the relay server R1 adds the individual terminal information 111 of the client terminal 31 to the resource sharable terminal information 110 stored in the relay group information database 505. Further, the relay server R1 transmits an "add-group-info message" to the client terminal 11, which is connected to the same LAN and has already been stored as the resource sharable terminal (sequence number 27.1). Having received the message, the client terminal 11 stores the individual terminal information 111 of the client terminal 31 in a suitable storage unit. Then, the client terminal 11 returns an "OK" response to the relay server R1. Having received the response, the relay server R1 returns an "OK" response to the relay server R3.

Then, the relay server R3 transmits a "group-info message" to the client terminal 31 (sequence number 28). The message includes the resource sharable terminal information 110 to which the individual terminal information 111 of the client terminal 31 is added. Having received the message, the client terminal 31 stores the content of the received resource sharable terminal information 110 in a suitable storage unit.

Then, the relay server R3 also transmits, to the relay server R2, the "add-group-info message" requesting for the addition of the resource sharable terminal to the relay group (sequence number 29). Having received the message, the relay server R2 adds the individual terminal information 111 of the client terminal 31 to the resource sharable terminal information 110 stored in the relay group information database 505. Further, the relay server R2 transmits the "add-group-info message" to the client terminal 21, which is connected to the same LAN and has already been stored as the resource sharable terminal (sequence number 29.1). Having received the message, the client terminal 21 stores the individual terminal information 111 of the client terminal 31 in a suitable storage unit. Then, the client terminal 21 returns an "OK" response to the relay server R2. Having received the response, the relay server R2 returns an "OK" response to the relay server R3.

Thus, the individual terminal information 111 of each client terminal 11, 21, 31 is registered as the resource sharable terminal in the resource sharable terminal information 110 of the relay group information 100 stored in the relay group information database 505 of each relay server R1, R2, and R3.

Although not illustrated in FIG. 9, an operation for adding the client terminals 12 and 22 to the relay group information (having the identification ID "0001@relay-server1") is further performed. As a result, the individual terminal information 111 of each client terminal 11, 12, 21, 22, and 31 is registered as the resource sharable terminal in the resource sharable terminal information 110 of the relay group information 100 (refer to reference numeral 110a of FIG. 6). Furthermore, an operation for adding the client terminals 11 and 21 to the other relay group information (having the identification ID "0002@relay-server1") is subsequently performed (refer to reference numeral 110b of FIG. 6).

The process of registering the client terminals as the resource sharable terminals has been described in FIG. 9. The relay server 1 can also perform a process ("deleteTerminal method") of unregistering the client terminal 5 as the resource sharable terminal. In such a case, the individual terminal information 111 of the specified client terminal 5 is deleted from the resource sharable terminal information 110.

Figure 10:
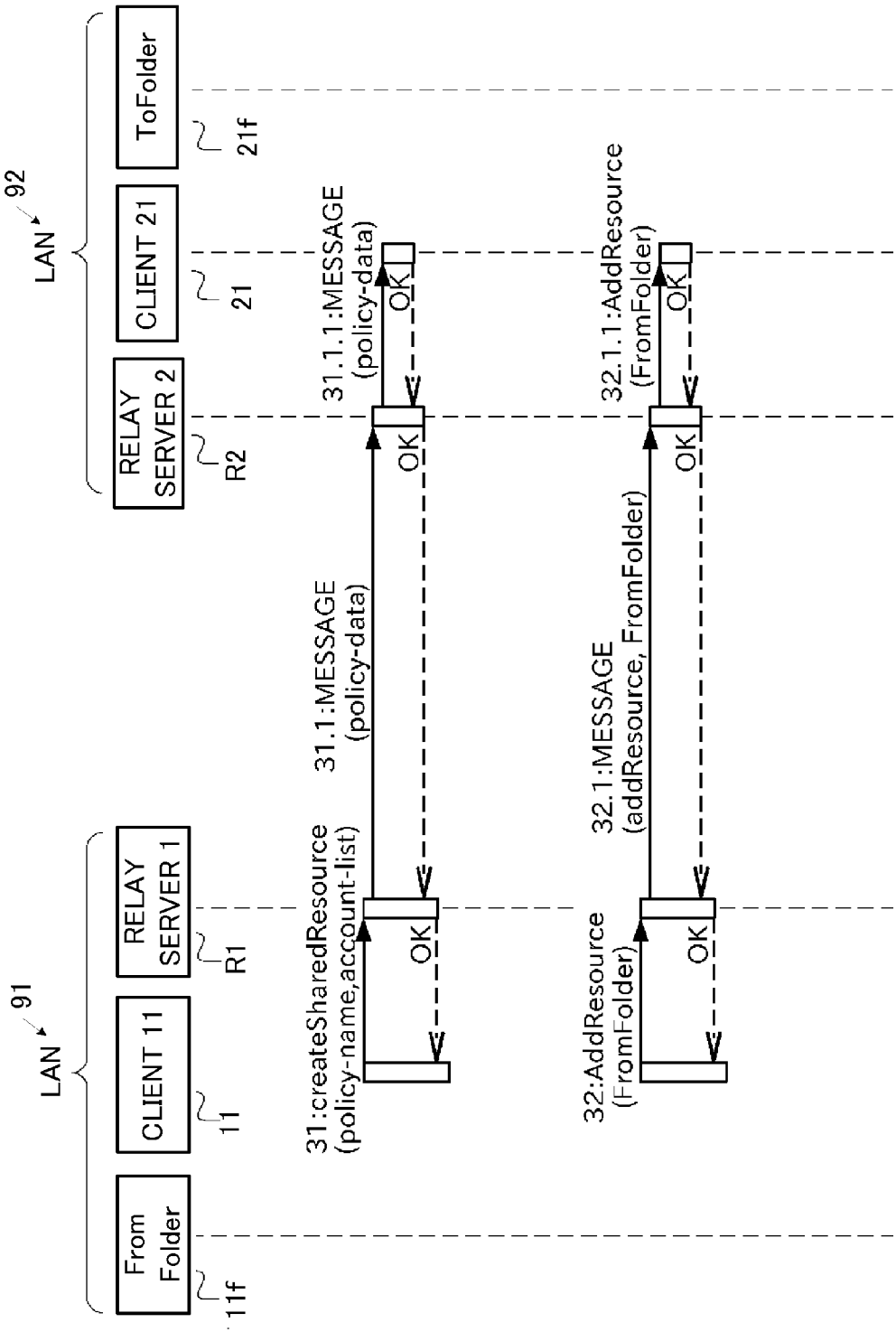
FIG. 10 is a sequence chart illustrating a communication process in which a shared resource is registered in the relay group according to a preferred embodiment of the present invention.

Next, with reference to FIG. 10, an operation for sharing the resource of the client terminal 5 is described. An example in which the folder "FromFolder" held by the client terminal 11 is shared with the client terminals 12 and 21 in the relay group having the identification ID "0001@relay-server1" is described.

The user specifies the relay group having the identification ID "0001@relay-server1" by operating the client terminal 11 and then instructs the client terminal 11 to display the resource sharable terminals of the relay group. The client terminal 11 acquires the information related to the resource sharable terminals by communicating with the relay server R1 and displays on a screen a list of resource sharable terminals of the specified relay group.

Because the relay group having the identification ID "0001@relay-server1" is specified, the client terminals 12, 21, 22, and 31 are displayed as the resource sharable terminals based on the resource sharable terminal information 110a illustrated on the upper side of FIG. 6. The user specifies the displayed client terminal 21 as the terminal (user client terminal) that will share the resource. Although only the terminal 21 is specified to share the resource in the present example, a plurality of client terminals or all of the client terminals can be specified from the displayed list of resource sharable terminals.

Accordingly, the client terminal 11 transmits a request (createSharedResource command) for creating a shared resource to the relay server R1 (sequence number 31 of FIG. 10). The message includes the identification ID of the relay group and the information related to the specified user client terminal 21.

Having received the message, the relay server R1 creates the shared resource information 120 to store in the shared resource information database 506 thereof. Further, the relay server R1 refers to the content of the relay group information database 505 based on the identification ID of the relay group and transmits a "policy-data message" to the relay server R2, which forms the relay group, to notify of the created individual shared resource information 122a (sequence number 31.1).

Having received the message, the relay server R2 creates the shared resource information 120 in the shared resource information database 506 thereof. Moreover, the relay server R2 transmits the "policy-data message" to the specified user client terminal 21 to notify of the shared resource information (sequence numbers 31.1.1).

Having received the "policy-data message", the user of the client terminal 21 changes the shared resource information 120 stored in the shared resource information database 604 thereof, and then returns an "OK" response to the relay server R2, which is the transmission source. Having received the "OK" response, the relay server R2 returns an "OK" response to the relay server R1. Having received the response, the relay server R1 returns an "OK" response to the client terminal 11.

Thus, the shared resource identification information 123 and the family account information 124 are described in the shared resource information 120 stored in the shared resource information database 506 of each relay server R1 and R2. The same content is described in the shared resource information 120 stored in the shared resource information database 604 of each client terminal 11 and 21.

Then, the user operates the client terminal 11 to execute an "addResource method". Accordingly, a process of adding the resource information (reference numeral 126a of FIG. 7) indicating the shared resource to the individual shared resource information 122a is performed. In the present example, the "FromFolder" is selected from the resources stored in the resource storage unit 603 of the client terminal 11 and is specified to be shared by the other client terminal 21.

Having received such specification, the client terminal 11 transmits to the relay server R1 a resource adding request (AddResource command) including the specified resource information (sequence number 32). Having received the resource adding request, the relay server R1 stores the changed shared resource information in the shared resource information database 506 thereof. Then, the relay server R1 transmits an "addResource message" to the relay server R2, with which the user client terminal 21 is connected, to notify of the added resource information 126a (sequence numbers 32.1).

Having received the message, the relay server R2 stores in the shared resource information database 506 thereof the shared resource information 120 to which the resource information 126a is added. Moreover, the relay server R2 transmits the resource adding request "addResource" to the specified user client terminal 21 to notify of the specified resource information 126a (sequence numbers 32.1.1).

Having received the resource adding request, the user client terminal 21 adds the resource information 126a to the shared resource information 120 stored in the shared resource information database 604 thereof and returns an "OK" response to the relay server R2, which is the transmission source. Having received the "OK" response, the relay server R2 returns an "OK" response to the relay server R1. Having received the response, the relay server R1 returns an "OK" response to the client terminal 11.

In the above-described processes, the resource information 126a (refer to FIG. 7) related to the folder "FromFolder" is added to the shared resource information 120 (individual shared resource information 122a) stored in each client terminal 5 and relay server 1.

Subsequently, although not illustrated, the individual shared resource information 122b is created in the client terminals 11 and 31 and then stored in the corresponding shared resource information 120. Then, an operation for adding a folder "FromFolder2" related to resource information 126c to the individual shared resource information 122b is performed.

Figure 11:
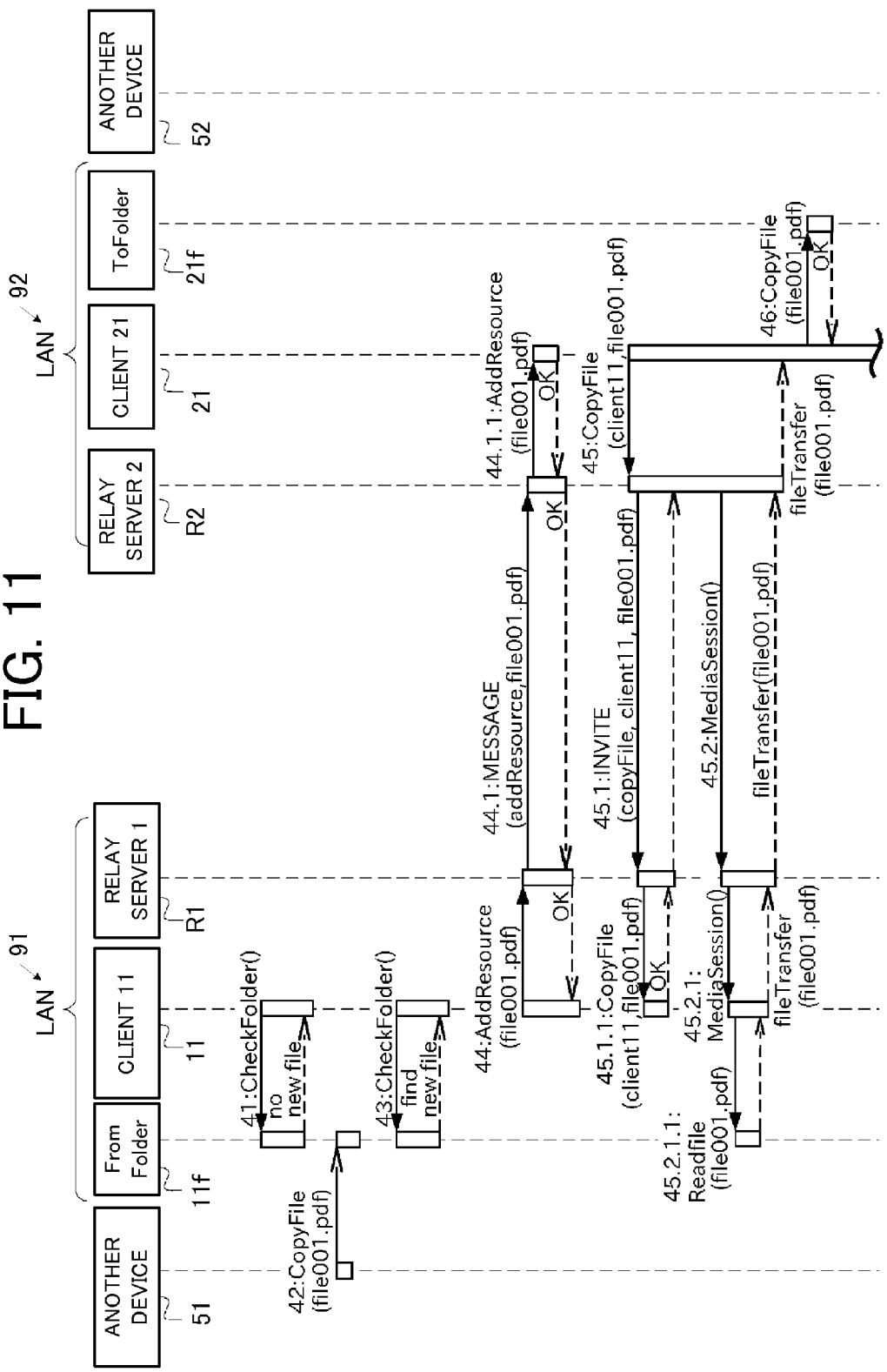
FIG. 11 is a sequence chart illustrating the first half of a process of transferring a file performed in the relay communication system according to a preferred embodiment of the present invention.
Figure 12:
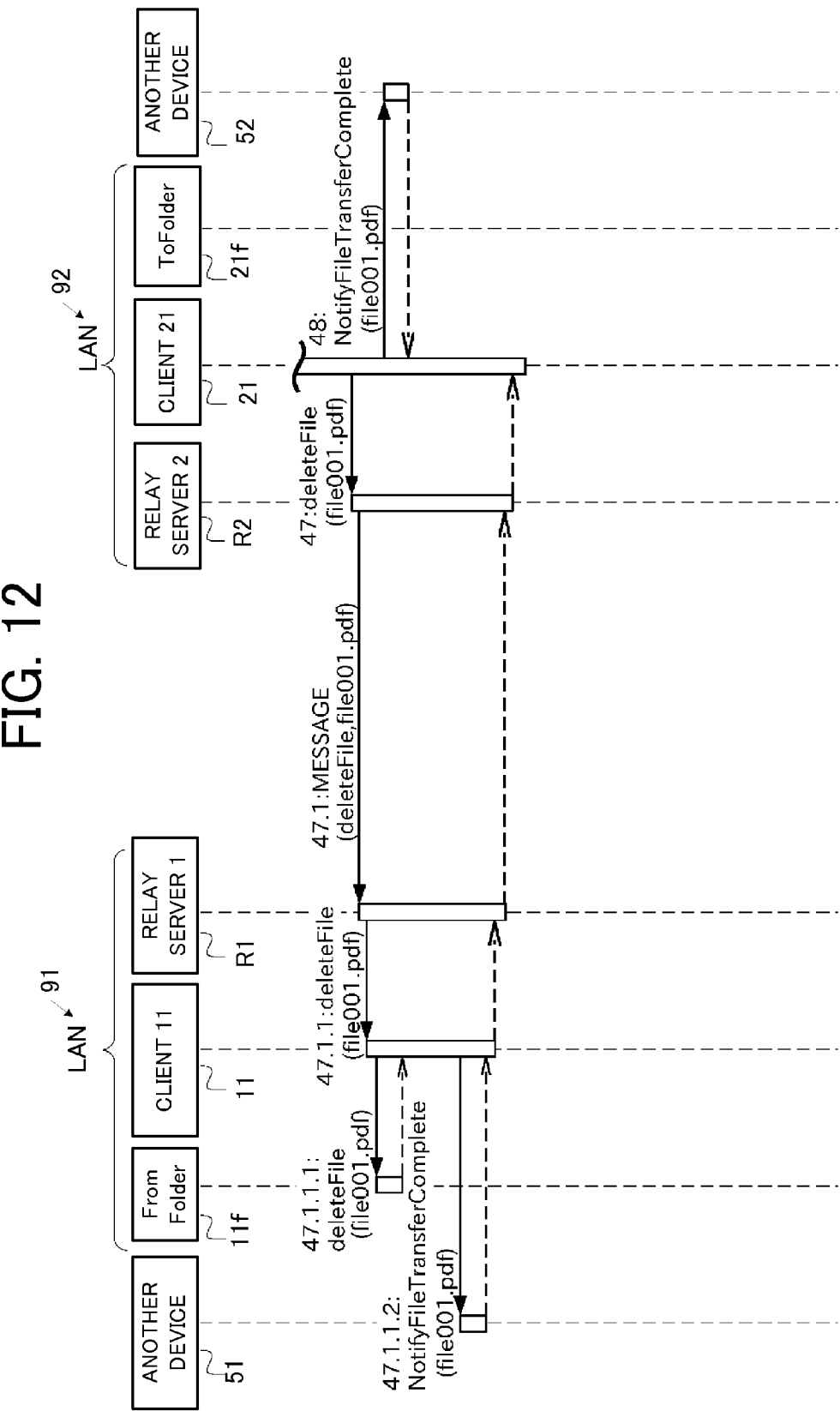
FIG. 12 is a sequence chart illustrating the second half of the process of transferring the file according to a preferred embodiment of the present invention.

Next, with reference to FIGS. 11 and 12, a process of automatically transferring a resource performed when the resource is added to a certain folder is described. FIGS. 11 and 12 are sequence charts illustrating an automatic file transferring process.

The client terminal 11 repeatedly executes a "CheckFolder command" at specified time intervals and, thus, regularly checks the content of the specified folder created in the resource storage unit 603 of the client terminal 11 (sequence number 41). The information about which folder is to be checked is set in advance through the transfer setting storage unit 605 of the client terminal 11. In this example, the folder "FromFolder" is set to be checked. In the following descriptions, the folder ("FromFolder") can be referred to as a transfer source folder. As a result of the checking, when the addition of the resource to a transfer source folder 11f is not detected, the client terminal 11 does not perform any process.

It is now assumed that a user of another device 51 desires to transfer a file to a destination device 52, executes a "CopyFile command", and copies the target file stored in a local storage unit of the device 51 to the transfer source folder 11f of the client terminal 11 (sequence number 42). As a result of the "CopyFile command", a file "file001.pdf" is added to the transfer source folder 11f.

The device 51 operated by the operator or the user is connected to the client terminal 11 via the network and can write files and/or folders in the transfer source folder (FromFolder) of the client terminal 11. Further, the destination device 52 is connected to the client terminal 21 via the network. A proper folder is created in advance in the resource storage unit 603 of the client terminal 21, and data, such as files transferred from the client terminal 11 to the client terminal 21, is stored in the created folder (transfer destination folder 21f). In the present example, a folder "ToFolder" is created as the transfer destination folder 21f. The destination device 52 can read the content of the transfer destination folder 21f via the network.

However, individual terminal information related to the devices 51 and 52 is not described in the relay group information 100 (FIG. 6), and therefore, the devices 51 and 52 cannot directly participate in the resource sharing using the relay communication system according to the present preferred embodiment.

Then, when the "CheckFolder command" is executed by the client terminal 11 (sequence number 43), it is detected that the file has been added. In response, the client terminal 11 immediately refers to the transfer setting storage unit 605 thereof and searches for the target individual shared resource information to which the resource is added when the new resource is stored in the "FromFolder".

In the present example, when the resource is stored in the "FromFolder", the resource information related to the resource is added to the individual shared resource information 122a illustrated on an upper side of FIG. 7. Accordingly, the client terminal 11 adds the resource information 126b related to the added file to the individual shared resource information 122a stored in the shared resource information database 604. In the individual shared resource information 122a, the resource information 126b is added such that the resource information 126b is a child element of the resource information 126a of the shared folder "FromFolder".

Then, the client terminal 11 transmits to the relay server R1 a request (AddResource command) for the addition of the resource information 126 to the shared resource information 120 (sequence number 44). Then, the relay server R1 transmits an "addResource message" to the relay server R2, with which the user client terminal 21 is connected, to notify of the added resource information 126a (sequence number 44.1).

The process of the "AddResource command" is performed as described in sequence numbers 44 and 44.1.1. The process is substantially similar to the processes described in sequence numbers 32 and 32.1.1 of FIG. 10, and thus, the description thereof is omitted. Accordingly, the shared resource information 120 to which the resource information about the file "file001.pdf" is stored in the shared resource information database 506 of each relay server R1 and R2 and in the shared resource information database 604 of each client terminal 11 and 21.

When the shared resource information 120 is updated, the client terminal 21 is arranged to automatically check whether or not any shared resource has been added to the individual shared resource information 122a, which is specified in advance through the transfer setting storage unit 605.

In the present example, the client terminal 21 detects that the file "file001.pdf" has been added to the shared resource information 122a as the shared resource. Accordingly, the client terminal 21 specifies the shared resource (file001.pdf) and transmits a file data transfer request (CopyFile command) to the relay server R2 (sequence number 45).

When the transfer request is received, the relay server R2 transmits an "INVITE message" to the relay server R1 and establishes a session with the relay server R1 (sequence number 45.1). At this time, by transmitting a copy instruction (CopyFile), the relay server R2 relays the transfer request to the relay server R1. Having received the transfer request, the relay server R1 transmits the "CopyFile command" to the client terminal 11, and thus, further relays the file data transfer request (sequence number 45.1.1).

When a media session is established in accordance with a media session command (sequence numbers 45.2 and 45.2.1), the client terminal 11, which has received the file data transfer request, reads out the data of the specified shared resource (file001.pdf) (sequence number 45.2.1.1). Because the file is stored in the transfer source folder 11f ("FromFolder"), the data is read from the transfer source folder 11f. The client terminal 11 transmits the read out data to the relay server R1 (fileTransfer). The data transmitted to the relay server R1 is transferred to the client terminal 21 via the relay server R2 (fileTransfer). Having received the data of the file, the client terminal 21 stores the data under the file name "file001pdf" in the transfer destination folder 21f ("ToFolder") predetermined through the transfer setting storage unit 605 (sequence number 46).

When the data is stored, the client terminal 21 transmits a shared resource information deletion request (deleteFile command) to the relay server R2 (sequence number 47 of FIG. 12).

Having received the resource information deletion request, the relay server R2 transmits a "deleteFile message" to the relay server R1, and thus, relays the deletion request (sequence number 47.1). Having received the deletion request, the relay server R1 transmits the deletion request (deleteFile command) to the client terminal 11 (sequence number 47.1.1).

Having received the deletion request, the client terminal 11 deletes the resource information 126*b* of the "file001.pdf" from the shared resource information 120 (individual shared resource information 122*a*) stored in the shared resource information database 604 thereof. Subsequently, a "file deletion command" (deleteFile) is executed in the client terminal 11, and thus, the data of the "file001.pdf" is deleted from the transfer source folder 11*f* ("FromFolder") (sequence number 47.1.1.1).

Then, the client terminal 11 executes a "NotifyFileTransferComplete method" and transmits a file transfer completion notification to the device 51, which is the copy source of the target resource (sequence number 47.1.1.2). Moreover, the client terminal 21 also executes a "NotifyFileTransferComplete method" and transmits a file transfer completion notification to a specified destination (for example, the device 52) (sequence number 48). The transfer completion notification notifies that the new resource has been transferred from the transfer source folder ("FromFolder") to the transfer destination folder ("ToFolder").

After learning through the file transfer completion notification that the file has arrived, a user or an operator operating the device 52 accesses the transfer destination folder 21*f* of the client terminal 21. By operating the device 52, the user can open the data of the file "file001.pdf" stored in the transfer destination folder 21*f* and check the content thereof or perform a process of copying the data to a local storage unit of the device 52.

In the above-described processes, the resource can be automatically transferred between the terminals connected to the respective LANs, and thus, files can be exchanged between the devices 51 and 52. Further, although not illustrated, the file transfer in an opposite direction can be performed by creating the transfer source folder in the client terminal 21, creating the transfer destination folder in the client terminal 11, and properly setting the transfer setting storage unit 605 of each client terminal 11 and 21.

Figure 13:
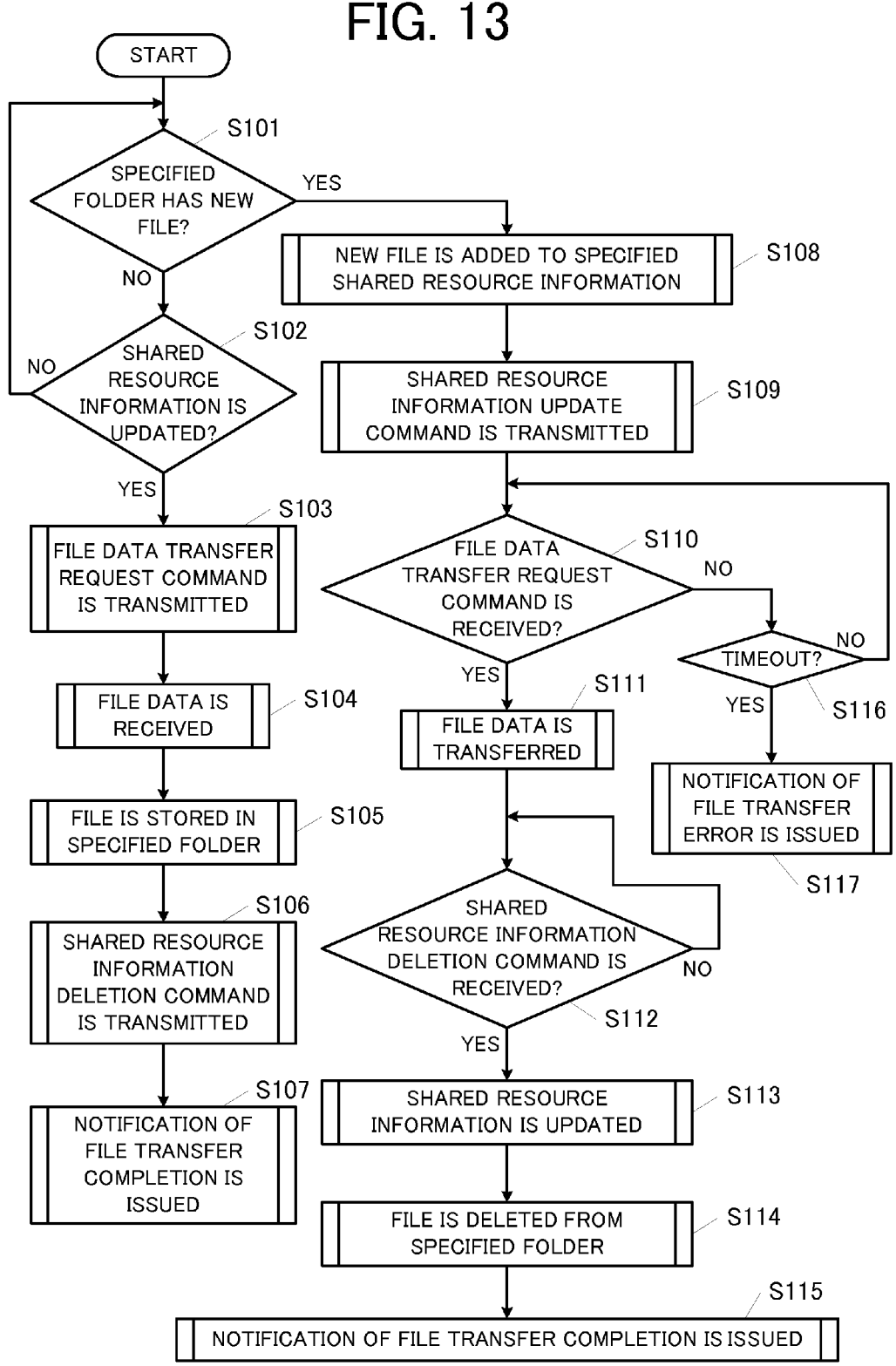
FIG. 13 is a flowchart of a file transferring process operation in the client terminal according to a preferred embodiment of the present invention.

Next, with reference to FIG. 13, a process of the client terminal 5 for performing the above-described automatic resource transferring process is described in detail. The flowchart of FIG. 13 illustrates a common program separately executed by the client terminals 11 and 21.

When the program is started, each of the client terminals 11 and 21 checks whether or not a file (resource) has been added to the transfer source folder that can be handled by the corresponding terminal (S101).

In the previous example, because the settings for the transfer source folder is stored in the transfer setting storage unit 605 of the client terminal 11, it is checked whether or not a newly added file is in the transfer source folder 11*f*. Because settings for the transfer source folder are not stored in the client terminal 21, such checking cannot be performed, and any new files are not found.

When it is determined in S101 that a new file is detected in the client terminal 11, a process of adding the new file to the specified shared resource information is performed (S108). In the process of S108, the client terminal 11 first refers to the transfer setting storage unit 605 thereof and thus determines, when the resource is stored in the transfer source folder 11*f*, the individual shared resource information 122 to which the resource is to be added. Then, the shared resource information 126*b* related to the resource (new file) is added to the target individual shared resource information 122*a*.

Subsequently, the client terminal 11 transmits, to the relay server R1, a command requesting to add the resource information to the shared resource information 120 of the other client terminal 21 in order to update the information (S109). Then, the client terminal 11 waits until a file data transfer request command is received (S110). If the file data transfer request command is not received within a specified period of time (S116), it is determined that the transfer has failed due to a communication error or other similar error, and a file transfer error notification is issued (S117).

In contrast, the client terminal 21 monitors the content of the specific individual shared resource information 122*a* specified through the transfer setting storage unit 605 thereof (S102). If the individual shared resource information 122*a* is not updated, the process returns to S101. In the process, the client terminal 21 waits until the target individual shared resource information 122*a* is updated.

When the shared resource information update command issued in the process of S109 by the client terminal 11 is received at the client terminal 21 via the relay servers R1 and R2, the individual shared resource information 122*a* is updated by the client terminal 21. Accordingly, in the determination of S102, the client terminal 21 detects that the target individual shared resource information 122*a* has been updated.

Then, the client terminal 21 checks the updated individual shared resource information 122*a*. Accordingly, it is determined that the added file is "file001.pdf" and that the owner client terminal, which can handle the file, is the client terminal 11. Thus, the client terminal 21 transmits a file data transfer request command to the relay server R2 (S103).

When the file data transfer request command is received via the relay servers R2 and R1, the client terminal 11 transmits the new file data to the relay server R1 in response to the command (S111). Then, the client terminal 11 waits until a shared resource information deletion command is received (S112).

The client terminal 21 receives the data transmitted in the process of S111 by the client terminal 11 via the relay servers R1 and R2 (S104). The client terminal 21 stores the data as a file in a suitable folder (S105). When the file is stored, the client terminal 21 transmits a deletion command to the relay server R2 in order to delete from the shared resource information the resource information related to the transferred file (S106). Then, the client terminal 21 issues, with respect to a specified device, a notification indicating that the file transfer has been completed (S107).

When the client terminal 11 receives the shared resource information deletion command transmitted in S112 by the client terminal 21 via the relay servers R2 and R1, the client terminal 11 updates the shared resource information 120 and deletes the resource information (S113). Further, the client terminal 11 deletes the data of the resource from the specified folder (transfer source folder 11*f*) (S114). Then, the client terminal 11 issues, with respect to the specified device, a notification indicating that the file transfer has been completed (S115).

As described above, the relay server 1 of the present preferred embodiment includes the relay group information database 505, the shared resource information database 506 arranged to store the shared resource information 120, and the control unit 503. The relay group information database 505 is arranged to store the information about the relay group (relay group information 100) including the other relay servers 1 that can be connected with the relay server. The shared resource information database 506 is arranged to store the shared resource information 120 when the resource is shared among the plurality of client terminals 5 in the relay group. The shared resource information 120 includes the resource information (family resource information 125) and the account information (family account information 124) of the resource sharing terminal, which is the client terminal that shares the resource. The control unit 503 includes the resource addition indicating unit 511, the transfer request relaying unit 512, and the deletion request relaying unit 513. The client terminal 11 monitors the transfer source folder 11f. As a result, when the client terminal 11 detects that the resource has been added to the transfer source folder 11f, and then adds the resource information 126 related to the added resource to the shared resource information 120, as illustrated in sequence numbers 44 and 44.1.1 of FIG. 11, the resource addition indicating unit 511 of the relay server R1 indicates the change of the shared resource information 120 in the shared resource information 120 of the other client terminal 21 in response to the "AddResource command" of the client terminal 11. Further, the client terminal 21 monitors the shared resource information 120 (specified individual shared resource information 122a). As a result, when the client terminal 21 detects that the resource has been added to the individual shared resource information 122a and then transmits the "CopyFile command" in order to request for the resource transfer as illustrated in sequence numbers 45 and 45.1 of FIG. 11, the transfer request relaying unit 512 of the relay server R2 transmits the copy instruction (copyFile) to the relay server R1, which is connected with the client terminal 11 that can handle the resource, and thus, the resource transfer request is relayed. Furthermore, the resource is transferred to the client terminal 21, which transmitted the "Copy-File command", and the resource is stored in the specified folder. Accordingly, when the client terminal 21 transmits the "deleteFile command" requesting for the deletion of the resource from the individual shared resource information 122a, as illustrated in sequence numbers 47 and 47.1, the deletion request relaying unit 513 of the relay server R2 transmits the "deleteFile message" to the relay server R1, which is connected to the client terminal 11, which can handle the resource, and thus, the resource information deletion request is relayed.

Accordingly, the client terminal 5 and the relay server 1 are operated together, and the resource added to the specified folder of the client terminal 5 can be automatically transferred to the specified folder of the other client terminal 5 via the network.

Moreover, as illustrated in sequence numbers 47.1.1 and 47.1.1.1 of FIG. 12, when the "deleteFile command" requesting to delete the resource information 126 related to the resource that can be handled by the client terminal 11 from the shared resource information 120 is received, the client terminal 11 of the present preferred embodiment deletes the resource information 126 from the shared resource information 120 and also deletes the resource.

Thus, the files can be automatically transferred via the different LANs.

In the present preferred embodiment, both the client terminal 21, which requests for the resource data transfer, and the client terminal 11, which receives such a transfer request, can issue a notification of transfer result (S107, S115, and S117 of FIG. 13).

Therefore, the users (of the devices 51 and 52) using the transfer function can appropriately learn the execution of the file transfer and normal completion or erroneous completion of the process.

In the present preferred embodiment, only one transfer source folder 11f "FromFolder" is monitored by the client terminal 11, however, a plurality of folders can be monitored. For example, in the case of FIG. 7 in which the individual shared resource information 122a and 122b are described, when the file is added to the folder "FromFolder", for example, the resource information 126 can be added to the individual shared resource information 122a, and when the file is added to the folder "FromFolder2", for example, the resource information 126 can be added to the shared resource information 122b. In such a case, the control unit 503 (the resource addition indicating unit 511) of the relay server R1 transmits the "addResource message" to the proper relay server 1 in accordance with the family account information 124 of the individual shared resource information 122a or 122b and then indicates the change of the individual shared resource information 122 in the individual shared resource information 122 of the other client terminal 5.

Thus, when the plurality of transfer source folders are monitored and when the files are organized and added with respect to each folder by the transfer source client, the files can be automatically distributed to the proper client terminal via the network. For example, it is assumed that the folders "FromFolder" and "FromFolder2" are added in advance with respect to each destination in the client terminal 11 at a head office. Further, the user at the head office operates the device 51 to add a file for Osaka branch office to the "FromFolder" and a file for Nagoya branch office to the "FromFolder2". Thus, the file for Osaka branch office can be automatically distributed and transferred to the "ToFolder" of the client terminal 21, and the file for Nagoya branch office can be automatically distributed and transferred to the "ToFolder" of the client terminal 31, thereby improving convenience.

In the present preferred embodiment, when a resource is added to the transfer source folder 11f in the client terminal 11, regardless of a type of the resource, the resource information 126 of the resource is added to the individual shared resource information 122a. However, the resource information 126 can be added to different individual shared resource information 122 in accordance with specified conditions that the resource meets. For example, it can be arranged such that when a file having a Portable Document Format (PDF) extension is copied to the transfer source folder 11f, the resource information 126 thereof can be added to the individual shared resource information 122a, and when a file having a Text File Format (TXT) extension is copied to the transfer source folder 11f, the resource information 126 thereof can be added to the individual shared resource information 122b. In such a case, the resource addition indicating unit 511 of the relay server R1 transmits an "addResource message" to the proper relay server 1 and indicates the change of the individual shared resource information 122 in the individual shared resource information 122 of the other client terminal 5.

Thus, the files added to one folder held by the client terminal are organized, automatically sorted, and transferred to the terminals on the network used for PDF file processing or to the terminals on the network used for text processing, for example, thereby improving convenience.

Preferred embodiments of the present invention have been described, however, the above-described configuration can be modified in many various ways including the examples described below.

Instead of being stored in the transfer setting storage unit 605 of the client terminal, the settings for the transfer source folder (folder to be monitored) and for the transfer destination folder, or similar settings, can be stored in a suitable storage unit of the relay server. In such a configuration, the information can be organized in the relay server, thereby the management thereof can be facilitated.

When notifying of the file transfer completion (S107, S155) and when notifying of the file transfer error (S117), a proper method of transmitting a message to the other client terminal and/or a method of outputting a log can be used.

In the above-described preferred embodiment, the transfer source folder 11f is added as the shared resource to the shared resource information 120. However, without sharing the transfer source folder 11f among the client terminals, by sharing the files etc. added to the folder, the file transfer can be smoothly performed.

The sorting of the transfer destination folders performed in accordance with the above-described preferred embodiment is not limited to the sorting that is based on the extension of the file. The sorting of the transfer destination folders can be performed in accordance with creation date and time of the file, a file creator, a specific key word in the file, a key word retrieved from the file contents, or other similar information, for example.

In the above-described preferred embodiment, it is set through the transfer setting storage unit 605 of each client terminal 11 and 21 such that one transfer destination folder corresponds to one transfer source folder; however, the above-described configuration can be modified such that each of the plurality of client terminals can hold a transfer source folder, and the file in the transfer source folder can be automatically transferred to one transfer destination folder of one client terminal. Such a configuration is convenient when it is desired to collect on one network (i.e., in one client terminal) the files that are separately held on each network to integrally manage the files.

While the present invention has been described with respect to preferred embodiments thereof, it will be apparent to those skilled in the art that the disclosed invention can be modified in numerous ways and can assume many embodiments other than those specifically set out and described above. Accordingly, the appended claims are intended to cover all modifications of the present invention that fall within the true spirit and scope of the present invention.

What is claimed is:

1. A relay server comprising:
   a relay group information registration unit arranged to store information about a relay group including other relay servers that are arranged to be connected with the relay server;
   a shared resource information registration unit arranged to store shared resource information including resource information and account information of each client terminal that shares a resource when the resource is shared by a plurality of client terminals in the relay group; and
   a control unit including:
      a resource addition indicating unit arranged to indicate a change of the shared resource information in the shared resource information of another client terminal when the client terminal monitors a specified monitoring-target folder, and as a result of the monitoring, detects addition of an additional resource to the monitoring-target folder and then adds resource information about the additional resource to the shared resource information;
      a transfer request relaying unit arranged to relay a resource transfer request to: the client terminal that belongs to the relay server and that is arranged to handle the additional resource, or the relay server that is connected with the client terminal that is arranged to handle the additional resource when the client terminal monitors specified monitoring-target shared resource information, and as a result of the monitoring, detects that the resource information about the additional resource has been added to the monitoring-target shared resource information and then requests for transfer of the additional resource; and
      a deletion request relaying unit arranged to relay a resource information deletion request only to the client terminal that belongs to the relay server and that is arranged to handle the additional resource, or the relay server that is connected with the client terminal that is arranged to handle the additional resource when the additional resource is transferred to the client terminal that requested the resource transfer and stored in a specified folder, and as a result of the transfer and storage of the additional resource, the client terminal requests for deletion of the resource information about the additional resource from the monitoring-target shared resource information.

2. The relay server according to claim 1, wherein the client terminal is arranged to hold a plurality of folders as monitoring-target folders, and when the additional resource is added to the monitoring-target folder, the client terminal adds information regarding the additional resource to the specified shared resource information in accordance with the monitoring-target folder to which the additional resource is added, and then, the resource addition indicating unit indicates the change of the shared resource information in the shared resource information of another client terminal.

3. The relay server according to claim 1, wherein, when a resource is added to the monitoring-target folder, the client terminal adds resource information regarding the additional resource to the specified shared resource information, and then, the resource addition indicating unit indicates the change of the shared resource information in the shared resource information of another client terminal.

4. The relay server according to claim 2, wherein, when the additional resource is added to the monitoring-target folder, the client terminal adds information regarding the additional resource to the specified shared resource information, and then, the resource addition indicating unit indicates the change of the shared resource information in the shared resource information of another client terminal.

5. A relay communication system comprising:
   a plurality of relay servers; and
   a plurality of client terminals; wherein
   each of the plurality of relay servers includes:
      a relay group information registration unit arranged to store information about a relay group including other relay servers that is arranged to be connected with the relay server;
      a shared resource information registration unit arranged to store shared resource information including resource information and account information of each client terminal that shares a resource when the resource is shared by the plurality of client terminals in the relay group; and
      a control unit including:
         a resource addition indicating unit arranged to indicate a change of the shared resource information in the shared resource information of another client terminal when the client terminal monitors a specified monitoring-target folder, and as a result of the monitoring, detects addition of an additional resource to the monitoring-target folder and then adds resource information about the additional resource to the shared resource information;
         a transfer request relaying unit arranged to relay a resource transfer request to: the client terminal that belongs to the relay server and that is arranged to handle the additional resource, or the relay server that is connected with the client terminal that is arranged to handle the additional resource when the client terminal monitors specified monitoring-target shared resource information, and as a result of the monitoring, detects that the resource information about the additional resource has been added to the monitoring-target shared resource information and then requests for transfer of the additional resource; and a deletion request relaying unit arranged to relay a resource information deletion request only to the client terminal that belongs to the relay server and that is arranged to handle the additional resource, or the relay server that is connected with the client terminal that is arranged to handle the additional resource when the additional resource is transferred to the client terminal that requested for the resource transfer and stored in a specified folder, and as a result of the transfer and storage of the additional resource, the client terminal requests for deletion of the resource information about the additional resource from the monitoring-target shared resource information.

6. The relay communication system according to claim 5, wherein the client terminal deletes the additional resource when the information regarding the additional resource that is arranged to be handled by the client terminal is deleted from the shared resource information.

7. The relay communication system according to claim 5, wherein at least one of the client terminal that requested for the resource transfer and the client terminal that received such request is arranged to issue a notification of a transfer result.

8. The relay communication system according to claim 6, wherein at least one of the client terminal that requested for the resource transfer and the client terminal that received such request is arranged to issue a notification of a transfer result.

* * * * *